(12) United States Patent
Bjerke et al.

(10) Patent No.: US 7,372,896 B2
(45) Date of Patent: May 13, 2008

(54) ITERATIVE DETECTION AND DECODING FOR A MIMO-OFDM SYSTEM

(75) Inventors: Bjorn Bjerke, Harvard, MA (US);
John W. Ketchum, Harvard, MA (US);
Jay Rodney Walton, Carlisle, MA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 11/557,662

(22) Filed: Nov. 8, 2006

(65) Prior Publication Data
US 2007/0064831 A1 Mar. 22, 2007

Related U.S. Application Data

(63) Continuation of application No. 10/005,104, filed on Dec. 3, 2001, now Pat. No. 7,154,936.

(51) Int. Cl.
*H04B 1/69* (2006.01)
(52) U.S. Cl. ........................ 375/148; 375/149; 375/150
(58) Field of Classification Search ................ 375/148, 375/149, 259, 261, 262, 341, 340, 239, 296, 375/316, 330, 136
See application file for complete search history.

(56) References Cited

U.S. PATENT DOCUMENTS 5,237,586 A * 8/1993 Bottomley .................. 370/206
6,731,696 B1 * 5/2004 Gelblum et al. ............. 375/322
6,977,974 B1 * 12/2005 Geraniotis et al. .......... 375/340
2005/0047517 A1 * 3/2005 Georgios et al. ............ 375/267
2007/0140374 A1 * 6/2007 Raleigh et al. ............. 375/267

OTHER PUBLICATIONS

Anh V. Nguyen et al, "Iterative Demodulation and Decoding of Differential Space-Time Block Codes", IEEE, VTS-2000, 52nd, vol. 5, pp. 2394-2400, Sep. 2000.*

* cited by examiner

*Primary Examiner*—Chieh M. Fan
*Assistant Examiner*—Qutub Ghulamali
(74) *Attorney, Agent, or Firm*—Amin, Turocy & Calvin, LLP

(57) ABSTRACT

Techniques to iteratively detect and decode data transmitted in a wireless (e.g., MIMO-OFDM) communication system. The iterative detection and decoding is performed by iteratively passing soft (multi-bit) "a priori" information between a detector and a decoder. The detector receives modulation symbols, performs a detection function that is complementary to the symbol mapping performed at the transmitter, and provides soft-decision symbols for transmitted coded bits. "Extrinsic information" in the soft-decision symbols is then decoded by the decoder to provide its extrinsic information, which comprises the a priori information used by the detector in the detection process. The detection and decoding may be iterated a number of times. The soft-decision symbols and the a priori information may be represented using log-likelihood ratios (LLRs). Techniques are provided to reduce the computational complexity associated with deriving the LLRs, including interference nulling to isolate each transmitted signal and "dual-maxima" approximation.

22 Claims, 9 Drawing Sheets

ITERATIVE DETECTION AND DECODING FOR A MIMO-OFDM SYSTEM

CLAIM OF PRIORITY UNDER 35 U.S.C. §119

The present Application for Patent claims priority to Provisional application No. 10/005,104 entitled "ITERATIVE DETECTION AND DECODING FOR A MIMO-OFDM SYSTEM" filed Dec. 3, 2001, now U.S. Pat. No. 7,154,936 and assigned to the assignee hereof and hereby expressly incorporated by reference herein.

BACKGROUND

1. Field

The present invention relates generally to data communication, and more specifically to techniques for performing iterative detection and decoding for a MIMO-OFDM communication system.

2. Background

A multiple-input multiple-output (MIMO) communication system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, with $N_S \leq \min\{N_T, N_R\}$. Each of the $N_S$ independent channels is also referred to as a spatial subchannel of the MIMO channel and corresponds to a dimension. The MIMO system can provide improved performance (e.g., increased transmission capacity) over that of a single-input single-output (SISO) communication system if the additional dimensionalities created by the multiple transmit and receive antennas are utilized.

A wideband MIMO system typically experiences frequency selective fading, i.e., different amounts of attenuation across the system bandwidth. This frequency selective fading causes inter-symbol interference (ISI), which is a phenomenon whereby each symbol in a received signal acts as distortion to subsequent symbols in the received signal. This distortion degrades performance by impacting the ability to correctly detect the received symbols. As such, ISI is a non-negligible noise component that may have a large impact on the overall signal-to-noise-and-interference ratio (SNR) for systems designed to operate at high SNR levels, such as MIMO systems. In such systems, equalization may be used at the receivers to combat ISI. However, the computational complexity required to perform equalization is typically significant or prohibitive for most applications.

Orthogonal frequency division multiplexing (OFDM) may be used to combat ISI, and achieves this without the use of computationally intensive equalization. An OFDM system effectively partitions the system bandwidth into a number of ($N_F$) frequency subchannels, which may be referred to as sub-bands or frequency bins. Each frequency subchannel is associated with a respective subcarrier upon which data may be modulated. The frequency subchannels of the OFDM system may experience frequency selective fading (i.e., different amounts of attenuation for different frequency subchannels), depending on the characteristics (e.g., multipath profile) of the propagation path between the transmit and receive antennas. With OFDM, the ISI due to the frequency selective fading may be combated by repeating a portion of each OFDM symbol (i.e., appending a cyclic prefix to each OFDM symbol), as is known in the art.

A MIMO system may thus advantageously employ OFDM to combat ISI. The frequency subchannels of the MIMO-OFDM system may experience different channel conditions (e.g., different fading and multipath effects) and may achieve different SNRs. Moreover, the channel conditions may vary over time. Consequently, the supported data rates may vary from frequency subchannel to frequency subchannel and from spatial subchannel to spatial subchannel, and may further vary with time. To achieve high performance, it is necessary to properly code and modulate the data at the transmitter (e.g., based on the determined channel conditions) and to properly detect and decode the received signals at the receiver.

There is therefore a need in the art for techniques to detect and decode signals that may have been (flexibly) coded and modulated based on one or more coding and modulation schemes, e.g., as determined by the channel conditions.

SUMMARY

Aspects of the invention provide techniques to iteratively detect and decode data transmitted in a wireless (e.g., MIMO-OFDM) communication system. The iterative detection and decoding exploits the error correction capabilities of the channel code to provide improved performance. This is achieved by iteratively passing soft (multi-bit) "a priori" information between a soft-input soft-output detector and a soft-input soft-output decoder.

The detector receives modulation symbols previously generated at a transmitter system based on one or more coding and modulation schemes, performs a detection function that is complementary to the symbol mapping performed at the transmitter system, and provides soft-decision symbols for transmitted coded bits. Extrinsic information in the soft-decision symbols (which comprises the a priori information for the decoder, as described below) is then decoded by the decoder based on one or more decoding schemes complementary to the one or more coding schemes used at the transmitter system. The decoder further provides its extrinsic information (which comprises the a priori information for the detector) that is then used by the detector in the detection process.

The detection and decoding may be iterated a number of times. During the iterative detection and decoding process, the reliability of the bit decisions is improved with each iteration. The iterative detection and decoding process described herein may be used to combat frequency selective fading as well as flat fading. Moreover, the iterative detection and decoding process may be flexibly used with various types of coding schemes (e.g., serial and parallel concatenated convolutional codes) and with various modulation schemes (e.g., M-PSK and M-QAM).

The a priori information passed between the detector and decoder and the soft-decision symbols may be represented using log-likelihood ratios (LLRs). Techniques are provided herein to reduce the computational complexity associated with deriving the LLRs. Such techniques include the use of interference nulling to isolate each transmitted signal by removing the other interferers and the use of a "dual-maxima" or some other approximation to compute the LLRs, which are described below.

Various aspects and embodiments of the invention are described in further detail below. The invention further provides methods, receiver units, transmitter units, receiver systems, transmitter systems, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The iterative detection and decoding techniques described herein may be used for various wireless communication systems. For clarity, various aspects and embodiments of the invention are described specifically for multiple-input multiple output communication system that implements orthogonal frequency division multiplexing (i.e., a MIMO-OFDM system).

As noted above, a MIMO system employs $N_T$ transmit antennas and $N_R$ receive antennas for data transmission, where $N_R \geq N_T$. A MIMO channel formed by the $N_T$ transmit antennas and $N_R$ receive antennas may be decomposed into $N_S$ spatial subchannels, where $N_S \leq \min \{N_T, N_R\}$. An OFDM system effectively partitions the system bandwidth into $N_F$ frequency subchannels. Each frequency subchannel may be defined to be sufficiently narrow so that its frequency response is considered flat or frequency non-selective. A MIMO-OFDM system may thus transmit data via a number of ($N_C$) "transmission channels" (where $N_C = N_S \cdot N_F$), with each such transmission channel corresponding to a frequency subchannel of a spatial subchannel.

Figure 1:
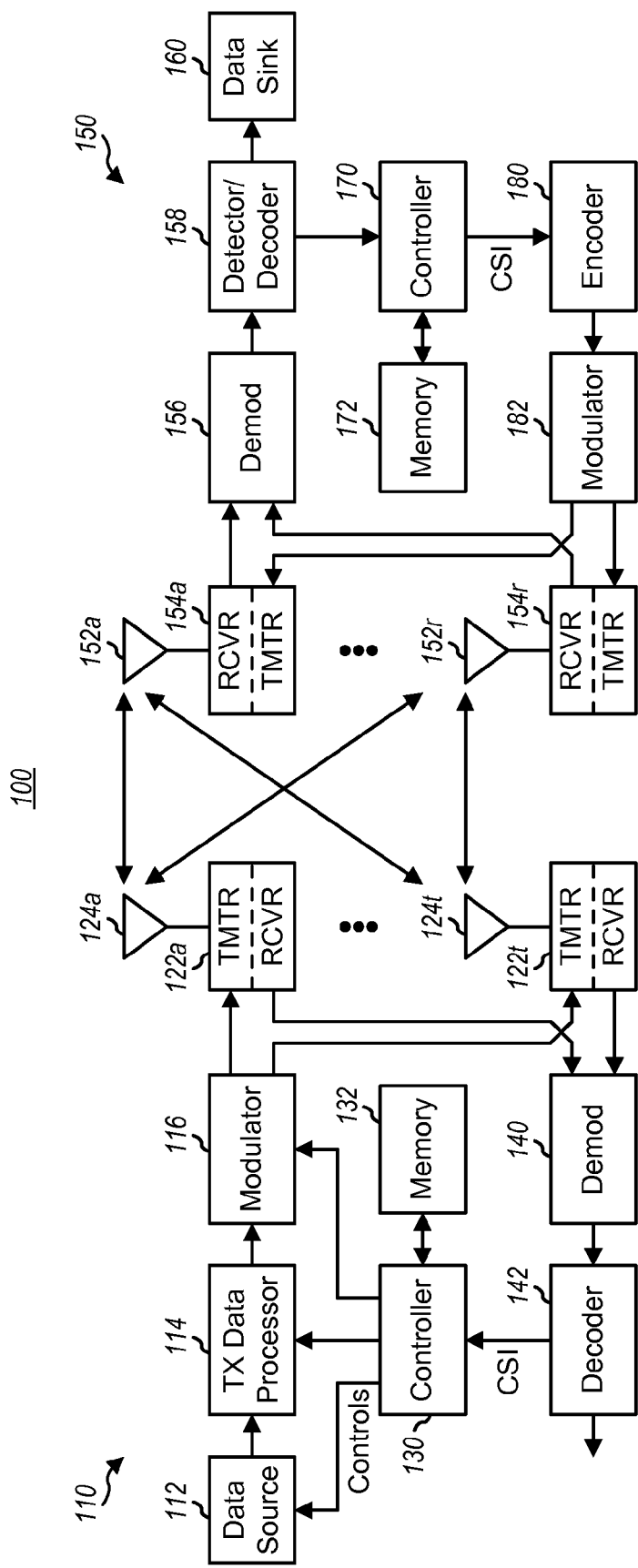
FIG. 1 is a block diagram of a transmitter system and a receiver system in a MIMO-OFDM system.

FIG. 1 is a block diagram of an embodiment of a transmitter system 110 and a receiver system 150 in a MIMO-OFDM system 100. Transmitter system 110 and receiver system 150 are capable of implementing various aspects and embodiments of the invention, as described below.

At transmitter system 110, traffic data is provided at a particular data rate from a data source 112 to a transmit (TX) data processor 114, which codes and interleaves the traffic data based on one or more coding schemes to provide coded data. The coding may be performed based on a single coding scheme for all transmit antennas, one coding scheme for each transmit antenna or each subset of transmit antennas, or one coding scheme for each transmission channel or each group of transmission channels. The data rate and the coding may be determined by a data rate control and a coding control, respectively, provided by a controller 130.

The coded data is then provided to a modulator 116, which may also receive pilot data (e.g., data of a known pattern and processed in a known manner). The pilot data may be multiplexed with the coded traffic data (e.g., using time division multiplexing (TDM) or code division multiplexing (CDM)) in all or a subset of the frequency subchannels and in all or a subset of the spatial subchannels used to transmit the traffic data. The pilot may be used by the receiver system to perform a number of functions such as acquisition, frequency and timing synchronization, channel estimation, coherent data demodulation, and so on.

In a specific embodiment, the processing by modulator 116 includes (1) modulating the received data with one or more modulation schemes (e.g., M-PSK, M-QAM, and so on) to provide modulation symbols, (2) transforming the modulation symbols to form OFDM symbols, and (3) appending a cyclic prefix to each OFDM symbol to form a corresponding transmission symbol. Similarly, the modulation may be performed based on a single modulation scheme for all transmit antennas, one modulation scheme for each transmit antenna or each subset of transmit antennas, or one modulation scheme for each transmission channel or each group of transmission channels. The modulation is performed based on a modulation control provided by controller 130. The modulated data (i.e., the transmission symbols) is then provided to transmitters (TMTR) 122a through 122t associated with the $N_T$ transmit antennas to be used for data transmission.

Each transmitter 122 converts the received modulated data into one or more analog signals and further conditions (e.g., amplifies, filters, and quadrature modulates) the analog signals to generate a modulated signal suitable for transmission over the communication channel. The modulated signals from transmitters 122a through 122t are then transmitted via antennas 124a through 124t, respectively, to the receiver system.

At receiver system 150, the transmitted modulated signals are received by antennas 152a through 152r, and the received signal from each antenna is provided to a respective receiver (RCVR) 154. Each receiver 154 conditions (e.g., filters, amplifies, and downconverts) a respective received signal and digitizes the conditioned signal to provide a respective stream of data samples, which represent the transmission symbols received via the associated antenna. A demodulator (Demod) 156 receives and demodulates the $N_R$ data sample streams from receivers 154a through 154r to provide $N_R$ corresponding streams of received modulation symbols. For each data sample stream, demodulator 156 removes the cyclic prefix included in each transmission symbol and then transforms each received OFDM symbol to provide a corresponding stream of received modulation symbols.

A detector/decoder 158 initially performs the detection function that is complementary to the symbol mapping and provides soft-decision (multi-bit) symbols for the coded bits transmitted from the transmitter system. The soft-decision symbols are then decoded based on one or more decoding schemes complementary to the one or more coding schemes used at the transmitter system. In an aspect, the detection and decoding may be performed iteratively a number of times, as described in further detail below. The decoded data is then provided to a data sink 160.

Controllers 130 and 170 direct the operation at the transmitter and receiver systems, respectively. Memories 132 and 172 provide storage for program codes and data used by controllers 130 and 170, respectively.

Transmitter System

Figure 2A:
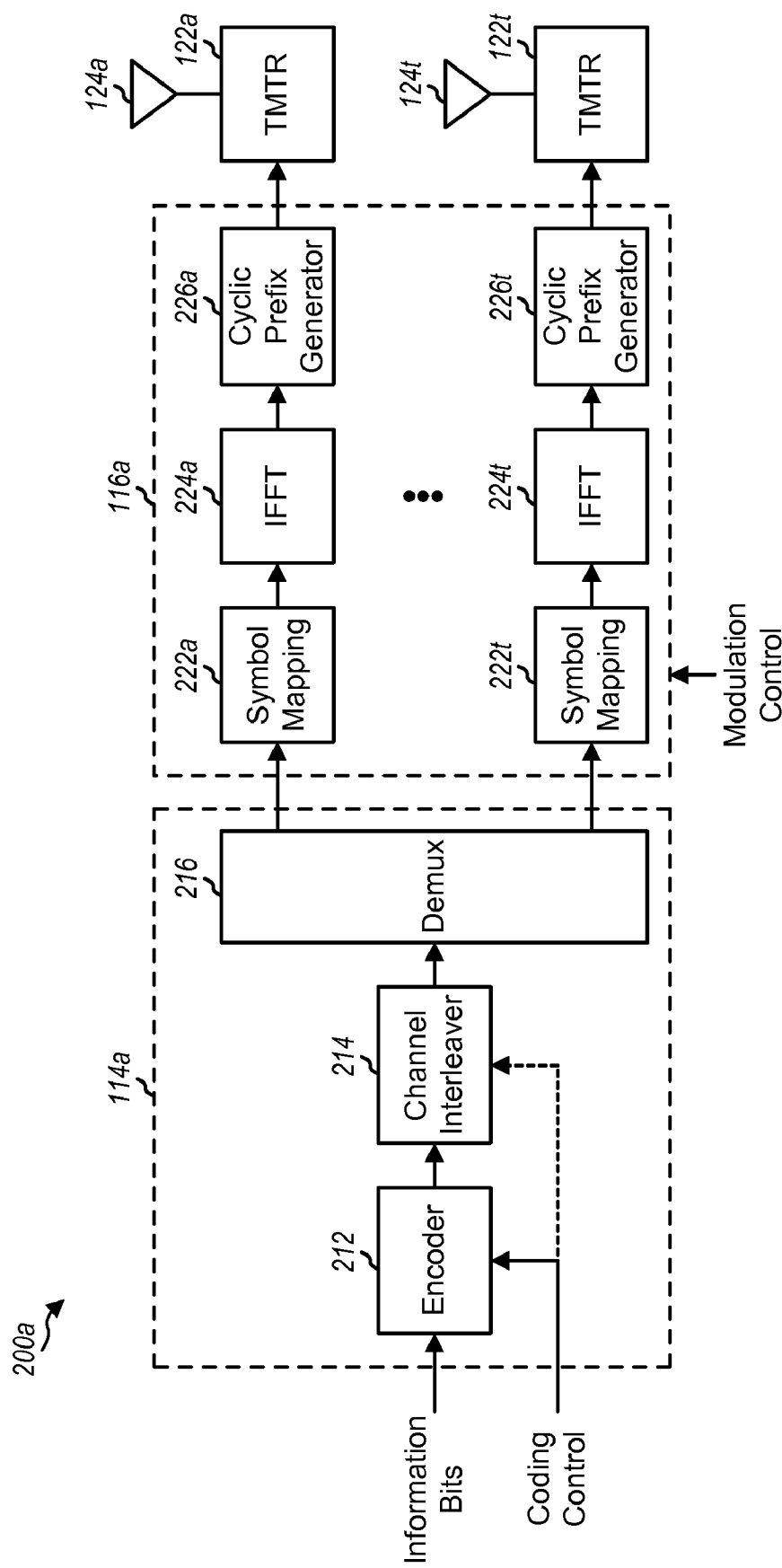
FIGS. 2A and 2B are block diagrams of two transmitter units that code and modulate data with (1) a single coding and modulation scheme and (2) separate coding and modulation schemes on a per-antenna basis, respectively.

FIG. 2A is a block diagram of a transmitter unit 200a, which is an embodiment of the transmitter portion of transmitter system 110 in FIG. 1. In this embodiment, a single coding scheme is used for all $N_T$ transmit antennas and a single modulation scheme is used for all $N_F$ frequency subchannels of all transmit antennas. Transmitter unit 200a includes (1) a TX data processor 114a that receives and codes traffic data in accordance with a specific coding scheme to provide coded data and (2) a modulator 116a that modulates the coded data in accordance with a specific modulation scheme to provide modulated data. TX data processor 114a and modulator 116a are thus one embodiment of TX data processor 114 and modulator 116, respectively, in FIG. 1.

In the specific embodiment shown in FIG. 2A, TX data processor 114a includes an encoder 212, a channel interleaver 214, and a demultiplexer (Demux) 216. Encoder 212 receives and codes the traffic data (i.e., the information bits) in accordance with the selected coding scheme to provide coded bits. The coding increases the reliability of the data transmission. The selected coding scheme may include any combination of cyclic redundancy check (CRC) coding, convolutional coding, Turbo coding, block coding, and so on. Several designs for encoder 212 are described below.

Channel interleaver 214 then interleaves the coded bits based on a particular interleaving scheme and provides interleaved coded bits. The interleaving provides time diversity for the coded bits, permits the data to be transmitted based on an average signal-to-noise-and-interference ratio (SNR) for the frequency and/or spatial subchannels used for the data transmission, combats fading, and further removes correlation between coded bits used to form each modulation symbol. The interleaving may further provide frequency diversity if the coded bits are transmitted over multiple frequency subchannels. The coding and channel interleaving are described in further detail below.

Demultiplexer 216 then demultiplexes the interleaved and coded data into $N_T$ coded data streams for the $N_T$ transmit antennas to be used for the data transmission. The $N_T$ coded data streams are then provided to modulator 116a.

In the specific embodiment shown in FIG. 2A, modulator 116a includes $N_T$ OFDM modulators, with each OFDM modulator assigned to process a respective coded data stream for one transmit antenna. Each OFDM modulator includes a symbol mapping element 222, an inverse fast Fourier transformer (IFFT) 224, and a cyclic prefix generator 226. In this embodiment, all $N_T$ symbol mapping elements 222a through 222t implement the same modulation scheme.

Within each OFDM modulator, symbol mapping element 222 maps the received coded bits to modulation symbols for the (up to) $N_F$ frequency subchannels to be used for data transmission on the transmit antenna associated with the OFDM modulator. The particular modulation scheme to be implemented by symbol mapping element 222 is determined by the modulation control provided by controller 130. For OFDM, the modulation may be achieved by grouping sets of q coded bits to form non-binary symbols and mapping each non-binary symbol to a specific point in a signal constellation corresponding to the selected modulation scheme (e.g., QPSK, M-PSK, M-QAM, or some other scheme). Each mapped signal point corresponds to an M-ary modulation symbol, where $M=2^q$. Symbol mapping element 222 then provides a vector of (up to) $N_F$ modulation symbols for each transmission symbol period, with the number of modulation symbols in each vector corresponding to the number of frequency subchannels to be used for data transmission for that transmission symbol period.

If conventional non-iterative symbol de-mapping and decoding are performed at the receiver system, then Gray mapping may be preferably used for the symbol mapping since it may provide better performance in terms of bit error rate (BER). With Gray mapping, the neighboring points in the signal constellation (in both the horizontal and vertical directions) differ by only one out of the q bit positions. Gray mapping reduces the number of bit errors for more likely error events, which correspond to a received modulation symbol being mapped to a location near the correct location, in which case only one coded bit would be received in error.

However, if iterative detection and decoding are performed as described below, it can be shown that non-Gray mapping outperforms Gray mapping. This is true due to the fact that independence between the coded bits enhances independence between the detection and decoding processes, which then provides improved performance when iterative detection and decoding are performed. Thus, each symbol mapping element 222 may be designed to implement a non-Gray mapped constellation. In certain instances, improved performance may be achieved if the constellation is defined such that neighboring points differ by as many bit positions as possible (i.e., the opposite goal as for Gray mapping, or "anti-Gray" mapping).

IFFT 224 then converts each modulation symbol vector into its time-domain representation (which is referred to as an OFDM symbol) using the inverse fast Fourier transform. IFFT 224 may be designed to perform the inverse transform on any number of frequency subchannels (e.g., 8, 16, 32, ..., $N_F$, ...). In an embodiment, for each OFDM symbol, cyclic prefix generator 226 repeats a portion of the OFDM symbol to form a corresponding transmission symbol. The cyclic prefix ensures that the transmission symbol retains its orthogonal properties in the presence of multipath delay spread, thereby improving performance against deleterious path effects such as channel dispersion caused by frequency selective fading. The transmission symbols from cyclic prefix generator 226 are then provided to an associated transmitter 122 and processed to generate a modulated signal, which is then transmitted from the associated antenna 124.

Figure 2B:
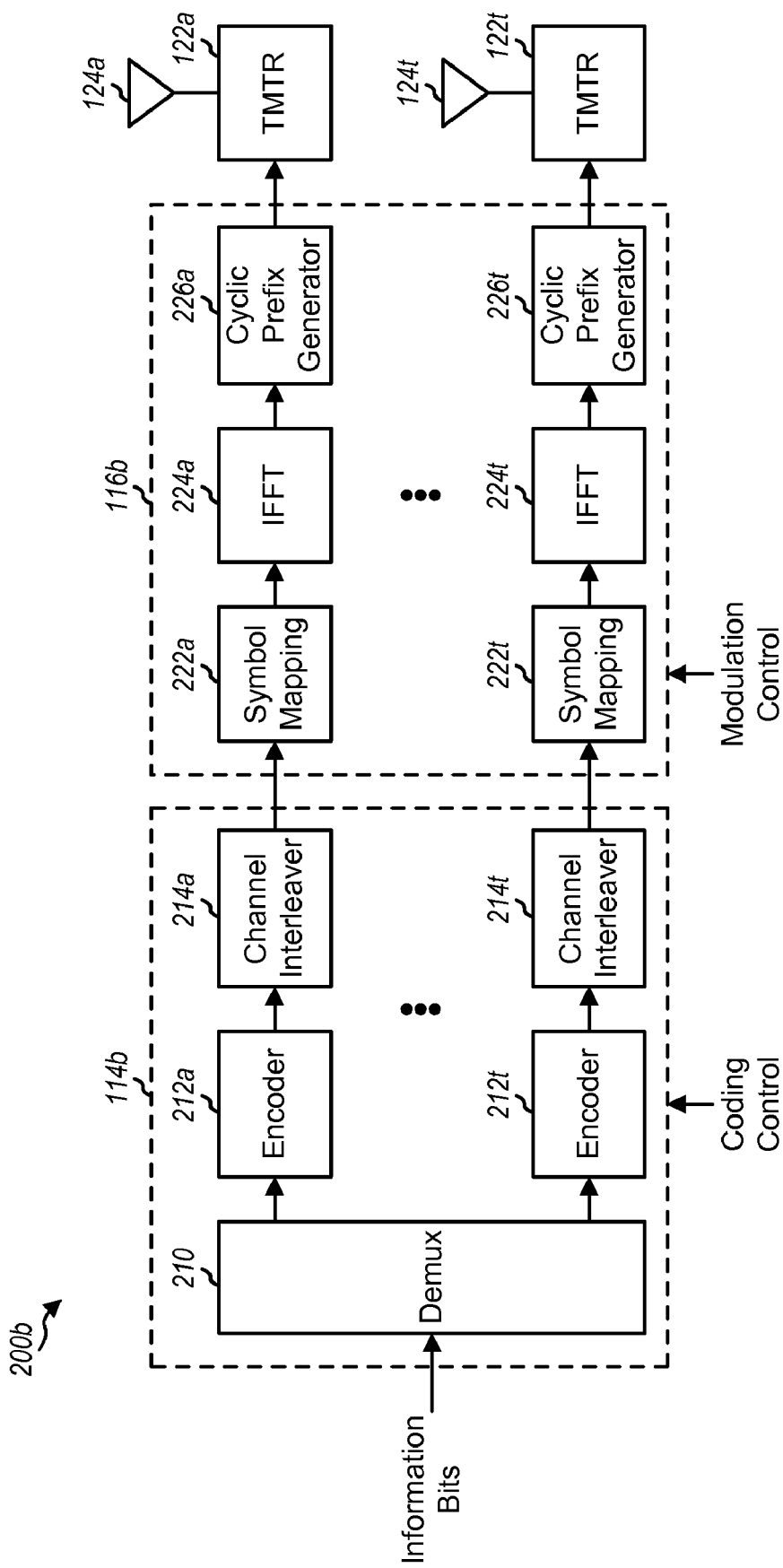

FIG. 2B is a block diagram of a transmitter unit 200b, which is another embodiment of the transmitter portion of transmitter system 110 in FIG. 1. In this embodiment, a particular coding scheme is used for each of the $N_T$ transmit antennas and a particular modulation scheme is used for all $N_F$ frequency subchannels of each transmit antenna (i.e., separate coding and modulation on a per-antenna basis). The specific coding and modulation schemes to be used for each transmit antenna may be selected based on the expected channel conditions (e.g., by the receiver system and sent back to the transmitter system).

Transmitter unit 200b includes (1) a TX data processor 114b that receives and codes traffic data in accordance with separate coding schemes to provide coded data and (2) a modulator 116b that modulates the coded data in accordance with separate modulation schemes to provide modulated data. TX data processor 114b and modulator 116b are another embodiment of TX data processor 114 and modulator 116, respectively, in FIG. 1.

In the specific embodiment shown in FIG. 2B, TX data processor 114b includes a demultiplexer 210, $N_T$ encoders 212a through 212t, and $N_T$ channel interleavers 214a through 214t (i.e., one set of encoder and channel interleaver for each transmit antenna). Demultiplexer 210 demultiplexes the traffic data (i.e., the information bits) into $N_T$ data streams for the $N_T$ transmit antennas to be used for the data transmission. Each data stream is then provided to a respective encoder 212.

Each encoder 212 receives and codes a respective data stream based on the specific coding scheme selected for the corresponding transmit antenna to provide coded bits. The coded bits from each encoder 212 are then provided to a respective channel interleaver 214, which interleaves the coded bits based on a particular interleaving scheme to provide diversity. Channel interleavers 214a through 214t then provide to modulator 116b $N_T$ interleaved and coded data streams for the $N_T$ transmit antennas.

In the specific embodiment shown in FIG. 2B, modulator 116b includes $N_T$ OFDM modulators, with each OFDM modulator including symbol mapping element 222, IFFT 224, and cyclic prefix generator 226. In this embodiment, the $N_T$ symbol mapping elements 222a through 222t may implement different modulation schemes. Within each OFDM modulator, symbol mapping element 222 maps groups of $q_n$ coded bits to form $M_n$-ary modulation symbols, where $M_n$ corresponds to the specific modulation scheme selected for the n-th transmit antenna (as determined by the modulation control provided by controller 130) and $M_n=2^q$. The subsequent processing by IFFT 224 and cyclic prefix generator 226 is as described above.

Other designs for the transmitter unit may also be implemented and are within the scope of the invention. For example, the coding and modulation may be separately performed for each subset of transmit antennas, each transmission channel, or each group of transmission channels. The implementation of encoders 212, channel interleavers 214, symbol mapping elements 222, IFFTs 224, and cyclic prefix generators 226 is known in the art and not described in detail herein.

The coding and modulation for MIMO systems with and without OFDM are described in further detail in U.S. patent application Ser. Nos. 09/826,481 and 09/956,449, both entitled "Method and Apparatus for Utilizing Channel State Information in a Wireless Communication System," respectively filed Mar. 23, 2001 and Sep. 18, 2001; U.S. patent application Ser. No. 09/854,235, entitled "Method and Apparatus for Processing Data in a Multiple-Input Multiple-Output (MIMO) Communication System Utilizing Channel State Information," filed May 11, 2001; U.S. patent application Ser. No. 09/776,075, entitled "Coding Scheme for a Wireless Communication System," filed Feb. 1, 2001; and U.S. patent application Ser. No. 09/993,087, entitled "Multiple-Access Multiple-Input Multiple-Output (MIMO) Communication System," filed Nov. 6, 2001. These applications are all assigned to the assignee of the present application and incorporated herein by reference. Still other coding and modulation schemes may also be used, and this is within the scope of the invention.

An example OFDM system is described in U.S. patent application Ser. No. 09/532,492, entitled "High Efficiency, High Performance Communication System Employing Multi-Carrier Modulation," filed Mar. 30, 2000, assigned to the assignee of the present invention and incorporated herein by reference. OFDM is also described by John A. C. Bingham in a paper entitled "Multicarrier Modulation for Data Transmission: An Idea Whose Time Has Come," IEEE Communications Magazine, May 1990, which is incorporated herein by reference.

Encoding

Various types of encoder may be used to code data prior to transmission. For example, the encoder may implement any one of the following (1) a serial concatenated convolutional code (SCCC), (2) a parallel concatenated convolutional code (PCCC), (3) a simple convolutional code, (4) a concatenated code comprised of a block code and a convolutional code, and so on. Concatenated convolutional codes are also referred to as Turbo codes.

Figure 3A:
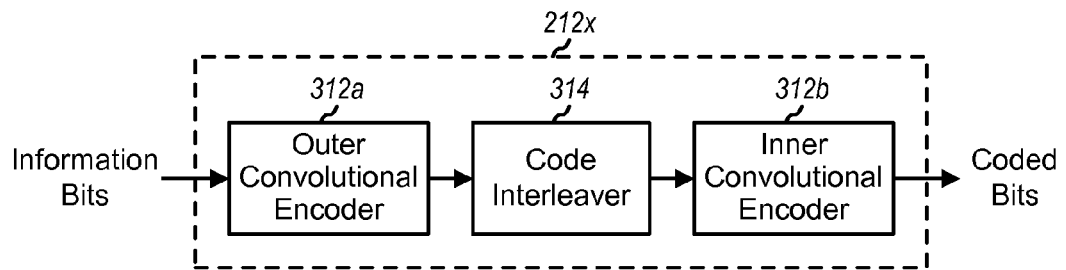
FIGS. 3A and 3B are block diagrams of serial and parallel concatenated convolutional encoders, respectively.

FIG. 3A is a block diagram of an embodiment of a serial concatenated convolutional encoder 212x, which may be used for each of encoders 212 in FIGS. 2A and 2B. Encoder 212x includes an outer convolutional encoder 312a, a code interleaver 314, and an inner convolutional encoder 312b, all coupled in series. Outer convolutional encoder 312a codes the information bits with a particular outer code of code rate $R_o$. The coded output from encoder 312a is provided to code interleaver 314, which interleaves each packet of $N_P$ coded bits in accordance with a particular (e.g., pseudo-random) interleaving scheme.

Code interleaver 314 may implement any one of a number of interleaving schemes, such as the ones used for cdma2000 and W-CDMA. In one specific interleaving scheme, the $N_P$ coded bits in a packet are written, by row, into a $2^5$-row by $2^n$-column array, where n is the smallest integer such that $N_P \leq 2^{5+n}$. The rows are then shuffled in accordance with a bit-reversal rule. For example, row 1 ("00001") is swapped with row 16 ("10000"), row 3 ("00011") is swapped with row 24 ("11000"), and so on. The bits within each row are then permutated (i.e., rearranged) according to a row-specific linear congruential sequence (LCS). The LCS for row k may be defined as $x_k(i+1)=\{x_k(i)+c_k\} \bmod 2^n$, where $i=0, 1, \ldots 2^n-1$, $x_k(0)=C_k$, and $C_k$ is a specific value selected for each row and is further dependent on the value for n. For the permutation in each row, the i-th bit in the row is placed in location x(i). The bits in the array are then read out by column.

The LCS code interleaving scheme is described in further detail in commonly assigned U.S. patent application Ser. No. 09/205,511, entitled "Turbo Code Interleaver Using Linear Congruential Sequences," filed Dec. 4, 1998, and in a cdma2000 document entitled "C.S0002-A-1 Physical Layer Standard for cdma2000 Spread Spectrum Systems," both of which are incorporated herein by reference. Other code interleavers may also be used and are within the scope of the invention. For example, a random interleaver or a symmetrical-random (S-random) interleaver may also be used instead of the LCS interleaver described above.

Inner convolutional encoder 312b receives and further codes the interleaved bits from code interleaver 314 with a particular inner code of code rate $R_i$. In an embodiment, encoder 312b implements a recursive code to fully realize the benefit of the significant interleaving gain provided by code interleaver 314. The inner code does not need to be a powerful code since the key desired property is recursiveness. In fact, the inner code may simply be a rate-1 differential code. The overall code rate for serial concatenated convolutional encoder 212x is $R_{SCCC}=R_o \cdot R_i$.

Figure 3B:
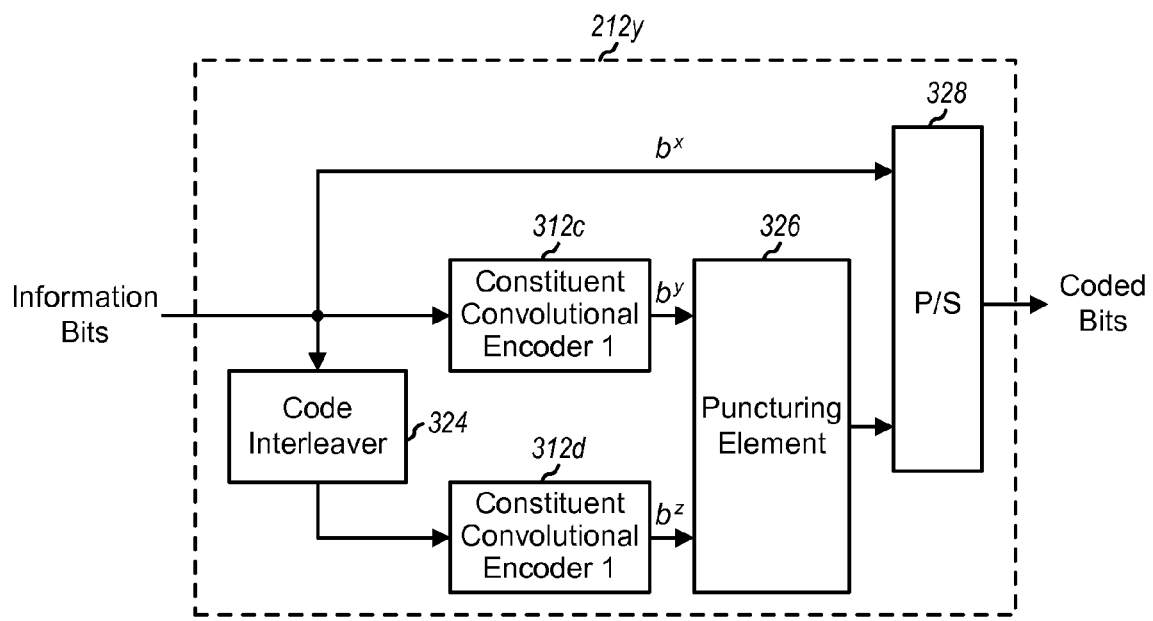

FIG. 3B is a block diagram of an embodiment of a parallel concatenated convolutional encoder 212y, which may also be used for each of encoders 212 in FIGS. 2A and 2B.

Encoder 212y includes two constituent convolutional encoder 312c and 312d, a code interleaver 324, a puncturing element 326, and a parallel-to-serial (P/S) converter 328. Code interleaver 324 interleaves the information bits in accordance with a particular (i.e., pseudo-random) interleaving scheme, and may be implemented as described above for code interleaver 314.

As shown in FIG. 3B, the information bits are provided to convolutional encoder 312c and the interleaved information bits are provided to convolutional encoder 312d. Each encoder 312 codes the received bits based on a particular constituent code and provides a respective stream of parity bits. Encoders 312c and 312d may be implemented with two recursive systematic constituent codes with code rates of $R_1$ and $R_2$, respectively. The recursive codes maximize the benefits provided by the interleaving gain.

The parity bits $b^y$ and $b^z$ from encoders 312c and 312d, respectively, are provided to puncturing element 326, which punctures (i.e., deletes) zero or more of the parity bits to provide the desired number of output bits. Puncturing element 326 is an optional element that may be used to adjust the overall code rate, $R_{PCCC}$, of the parallel concatenated convolutional encoder, which is given by $1/R_{PCCC}=1/R_1+1/R_2-1$.

The information bits (which are also referred to as the systematic bits), and the punctured parity bits from convolutional encoders 312c and 312d are provided to P/S converter 328 and serialized into a coded bit stream that is provided to the next processing element.

Figure 3C:
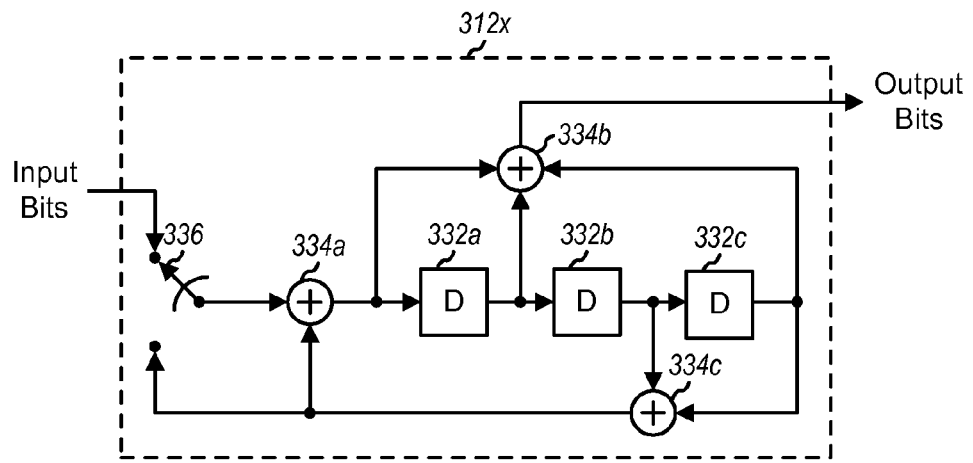
FIG. 3C is a block diagram of a recursive convolutional encoder.

FIG. 3C is a block diagram of an embodiment of a recursive convolutional encoder 312x, which may be used for each of encoders 312a through 312d in FIGS. 3A and 3B. Encoder 312x may also be used for each of encoders 212 in FIGS. 2A and 2B.

In the embodiment shown in FIG. 3C, encoder 312x implements the following transfer function for the recursive convolutional code:

$$G(D) = \left[1 \; \frac{n(D)}{d(D)}\right],$$

where $n(D)=1+D+D^3$, and $d(D)=1+D^2+D^3$.

Encoder 312x may also be designed to implement other convolutional codes, and this is within the scope of the invention.

Encoder 312x includes a number of series-coupled delay elements 332, a number of modulo-2 adders 334, and a switch 336. Initially, the states of delay elements 332 are set to zeros and switch 336 is in the up position. Then, for each received bit in a packet, adder 334a performs modulo-2 addition of the received bit with the output bit from adder 334c and provides the result to delay element 332a. Adder 334b performs modulo-2 addition of the bits from adder 334a and delay elements 332a and 332c and provides the parity bit. Adder 334c performs modulo-2 addition of the bits from delay elements 332b and 332c.

After all $N_I$ information bits in the packet have been coded, switch 336 is moved to the down position and three zero ("0") bits are provided to encoder 312x. Encoder 312x then codes the three zero bits and provides three tail systematic bits and three tail parity bits.

It can be shown analytically and via computer simulations that SCCCs provide better performance than PCCCs in additive white Gaussian noise (AWGN) channels at medium to high SNR levels, which is typically the desired operating region for MIMO systems. While the BER for PCCCs asymptotically reaches an error floor, this floor is absent or much lower for SCCCs. PCCCs outperform SCCCs in the high BER region, and may be more suitably used when the system loads approach the capacity limits of the channel at low SNRs. Both PCCCs and SCCCs may be implemented using relatively simple constituent codes (e.g., having constraint lengths of 3 to 16), such as the one shown in FIG. 3C.

Channel Interleaving

Referring back to FIGS. 2A and 2B, the coded bits from each encoder 212 are interleaved by a respective channel interleaver 214 to provide temporal, frequency, and/or spatial diversity against deleterious path effects (e.g., fading and multipath). Moreover, since the coded bits are subsequently grouped together to form non-binary symbols that are then mapped to M-ary modulation symbols, the interleaving may be used to ensure that the coded bits that form each modulation symbol are not located close to each other temporally (i.e., the channel interleaving distributes the coded bits that are temporally close together in a pseudo-random manner among modulation symbols that may be transmitted over different frequency subchannels, spatial subchannels, and/or transmission symbol periods). The combination of encoding, channel interleaving and symbol mapping (especially anti-Gray mapping) may be viewed as a serial concatenated code, where the symbol mapper takes on the role of the inner code. The channel interleaver provides interleaving gain in much the same way as in an SCCC, as described earlier. This potential for performance gain is unlocked by the iterative receiver structure described below. The channel interleaving can provide improved performance for various coding and modulation schemes, such as a single common coding and modulation scheme for all transmit antennas or separate coding and modulation scheme per antenna.

Various interleaving schemes may be used for the channel interleaver. In one interleaving scheme, the coded bits for each packet are written (linearly) to rows of an array. The bits in each row may then be permutated (i.e., rearranged) based on (1) a bit-reversal rule, (2) a linear congruential sequence (such as the one described above for the code interleaver), (3) a randomly generated pattern, or (4) a permutation pattern generated in some other manner. The rows are also permutated in accordance with a particular row permutation pattern. The permuted coded bits are then retrieved from each column of the array and provided to the next processing element. Other channel interleaving schemes may also be used and this is within the scope of the invention.

In an embodiment, the channel interleaving is performed separately for each independently coded data stream. For the PCCCs, the information bits and the tail and parity bits for each packet may also be channel interleaved separately. For example, the information bits $b^x$, the tail and parity bits by from the first constituent encoder 312c, and the tail and parity bits $b^z$ from the second constituent encoder 312d may be interleaved by three separate channel interleavers, which may employ the same or different interleaving schemes. This separate channel interleaving allows for flexible puncturing of the individual parity bits.

The interleaving interval may be selected to provide the desired temporal, frequency, and/or spatial diversity, or any combination thereof. For example, the coded bits for a particular time period (e.g., 10 msec, 20 msec, and so on) and for a particular combination of transmission channels may be interleaved. The channel interleaving may be performed for each transmit antenna, or across each group of transmit antennas or across all transmit antennas to provide spatial diversity. The channel interleaving may also be performed for each frequency subchannel, or across each group of frequency subchannels or across all frequency subchannels to provide frequency diversity. The channel interleaving may also be performed across each group of one or more frequency subchannels of each group of one or more transmit antennas such that the coded bits from one data stream may be distributed over one or more frequency subchannels of one or more transmit antennas to provide a combination of temporal, frequency, and spatial diversity. The channel interleaving may also be performed across all frequency subchannels of all transmit antennas.

Receiver System

Figure 4A:
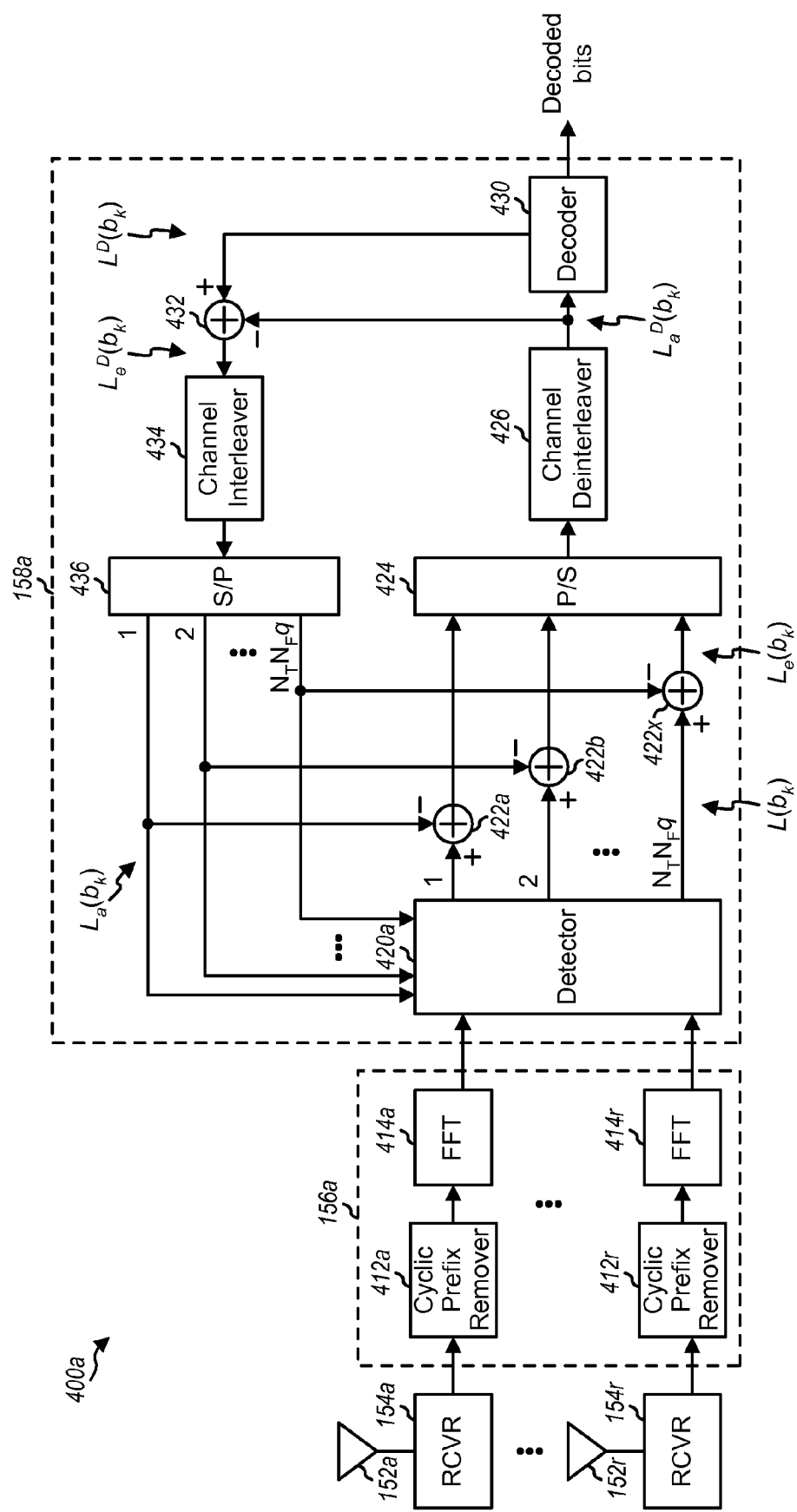
FIGS. 4A and 4B are block diagrams of two receiver units that detect and decode data previously processed with (1) a single coding and modulation scheme and (2) separate coding and modulation schemes on a per-antenna basis, respectively.

FIG. 4A is a block diagram of an embodiment of a receiver unit 400a, which is an embodiment of the receiver portion of receiver system 150 in FIG. 1. In this embodiment, a single demodulation scheme is used for all $N_F$ frequency subchannels of all $N_T$ transmit antennas and a single decoding scheme is used for all transmit antennas. Receiver unit 400a may thus be used to receive a data transmission from transmitter unit 200a in FIG. 2A.

The signals transmitted from the $N_T$ transmit antennas are initially received by each of $N_R$ antennas 152a through 152r and routed to a respective receiver 154 (which is also referred to as a front-end unit). Each receiver 154 conditions (e.g., filters, amplifies, and downconverts) a respective received signal and further digitizes the conditioned signal to provide data samples. Each receiver 154 may further demodulate the data samples with a recovered pilot to provide a stream of received transmission symbols, which is provided to a demodulator 156a.

In the specific embodiment shown in FIG. 4A, demodulator 156a includes $N_R$ OFDM demodulators, with each OFDM demodulator assigned to process a respective transmission symbol stream from one receive antenna. Each OFDM demodulator includes a cyclic prefix remover 412 and a fast Fourier transformer (FFT) 414. Cyclic prefix remover 412 removes the cyclic prefix previously appended to each OFDM symbol by the transmitter system to ensure ISI-free reception of the transmitted modulation symbols. FFT 414 then transforms each received OFDM symbol to provide a vector of $N_F$ received modulation symbols for the $N_F$ frequency subchannels used to transmit the OFDM symbol. The $N_R$ modulation symbol vectors from all $N_R$ OFDM demodulators for each transmission symbol period are provided to a detector/decoder 158a, which is one embodiment of detector/decoder 158 in FIG. 1.

In the embodiment shown in FIG. 4A, detector/decoder 158a includes a detector 420a and a decoder 430 that perform iterative detection and decoding on the modulation symbols received from all $N_R$ receive antennas to provide decoded data. The iterative detection and decoding exploits the error correction capabilities of the channel code to provide improved performance. This is achieved by iteratively passing soft "a priori" information between the soft-input soft-output (SISO) detector 420a and the soft-input soft-output decoder 430, as described in further detail below.

Detector 420a receives the modulation symbols from demodulator 156a and a priori information from decoder 430 and derives soft-decision (i.e., multi-bit) symbols for all $N_F$ frequency subchannels of all $N_T$ transmit antennas, with each such soft-decision symbol being an estimate of a coded bit transmitted by the transmitter system. As described in further detail below, the soft-decision symbols may be represented as log-likelihood ratios (LLRs), which are denoted as $L(b_k)$ in FIG. 4A.

For each transmission symbol period, detector 420a provides up to $N_B$ soft-decision symbols to $N_B$ respective summers 422, where $N_B = N_T \cdot N_F \cdot q$ and q is dependent on the specific modulation scheme used for the data transmission. Each summer 422 also receives the a priori information for its coded bit $b_k$ from decoder 430 (which is referred to as the detector a priori information and denoted as $L_a(b_k)$), and subtracts this detector a priori information from the received soft-decision symbol to derive extrinsic information for the coded bit (denoted as $L_e(b_k)$). The extrinsic information for all ($N_T \cdot N_F \cdot q$) coded bits is then (1) converted from parallel to serial by a P/S converter 424, (2) deinterleaved by a channel deinterleaver 426 in a manner complementary to the channel interleaving performed at the transmitter system, and (3) provided as a priori information from the detector to the decoder (which is referred to as the decoder a priori information and denoted as $L_a^D(b_k)$).

Decoder 430 uses the decoder a priori information in the decoding process and provides the decoded data. Decoder 430 further provides "a posteriori" information (denoted as $L_D(b_k)$) to a summer 432. Summer 432 then subtracts the decoder a priori information, $L_a^D(b_k)$, from the decoder a posteriori information, $L^D(b_k)$, to derive extrinsic information from the decoder for the detector (denoted as $L_e^D(b_k)$). This detector extrinsic information is then interleaved by a channel interleaver 434, converted from serial to parallel by a S/P converter 436, and provided as the detector a priori information, $L_a(b_k)$, to detector 420a and summers 422.

To briefly summarize, the output of the detection process may be expressed as:

$$L_e(b_k) = L(b_k) - L_a(b_k), \qquad \text{Eq (1)}$$

where $L(b_k)$ represents the soft-decision symbol for the k-th coded bit $b_k$;

$L_a(b_k)$ represents the detector a priori information for the k-th coded bit, which is provided by the decoder; and $L_e(b_k)$ represents the extrinsic information for the k-th coded bit provided by the detector to the decoder.

The output of the decoding process may similarly be expressed as:

$$L_e^D(b_k) = L^D(b_k) - L_a^D(b_k), \qquad \text{Eq (2)}$$

where $L^D(b_k)$ represents the a posteriori information for the k-th coded bit provided by the decoder;

$L_a^D(b_k)$ represents the decoder a priori information for the k-th coded bit provided by the detector; and $L_e^D(b_k)$ represents the extrinsic information for the k-th coded bit provided by the decoder to the detector.

As shown in FIG. 4A, the decoder a priori information, $L_a^D(b_k)$, is simply the detector extrinsic information, $L_e^D(b_k)$, after the parallel-to-serial conversion and channel deinterleaving. Similarly, the detector a priori information, $L_a(b_k)$, is simply the decoder extrinsic information, $L_e^D(b_k)$, after the channel interleaving and serial-to-parallel conversion.

The detection and decoding process may be iterated a number of times. During the iterative detection and decoding process, the reliability of the bit decisions is improved with each iteration. The iterative detection and decoding process described herein may be used to combat frequency selective fading (e.g., by using OFDM with cyclic prefix) as well as flat fading (without any modifications). Moreover, the iterative detection and decoding process may be flexibly used with various types of coding and modulation schemes, including the serial and parallel concatenated convolutional codes as described above.

In FIG. 4A, detector 420a provides soft-decision symbols for the transmitted coded bits based on the modulation symbols received from the $N_R$ receive antennas as well as the a priori information fed back from decoder 430. The soft-decision symbols may be conveniently represented in the form of log-likelihood ratios (LLRs) and include channel information, extrinsic information, and a priori information. The channel information for each coded bit includes information about the channel response between the transmit and receive antennas. The extrinsic information for each coded bit comprises incremental information about that coded bit that is extracted from other coded bits in the detection process. And the a priori information for each coded bit includes information about the coded bit that is known or derived outside the detection process.

In an embodiment, only the channel information and extrinsic information are passed from the detector to the decoder where, after parallel-to-serial conversion and channel deinterleaving, they are used as a priori information in the decoding process. For simplicity, the channel information and extrinsic information are collectively referred to as simply the extrinsic information. Ideally, the decoder a priori information should be provided by an independent source. However, since such a source is not available, an independent source may be mimicked by minimizing the correlation between the decoder a priori information (i.e., the detector output) and previous decisions made by the decoder (i.e., the detector a priori information). This is achieved by subtracting the detector a priori information from the soft-decision symbols derived by the detector, using summers 422 as shown in FIG. 4A.

LLR Computation by Detector

The modulation symbol received from the output of the OFDM demodulator coupled to the m-th receive antenna for the l-th frequency subchannel at time index j (i.e., transmission symbol period j) may be expressed as:

$$r_{m,l}(j) \sum_{n=1}^{N_T} h_{n,m,l}(j) \cdot c_{n,l}(j) + n_{m,l}(j), \qquad \text{Eq (3)}$$

where $h_{n,m,l}(j)$ is the channel response between the n-th transmit antenna and the m-th receive antenna for the l-th frequency subchannel at time index j;

$c_{n,l}(j)$ is the modulation symbol transmitted on the l-th frequency subchannel of the n-th transmit antenna; and $n_{m,l}(j)$ is a sample function of a zero-mean, temporally and spatially white Gaussian noise process.

To simplify notation, the time index j is dropped in the following derivations.

Equation (3) may be expressed in matrix form, as follows:

$$\underline{r}_l = \underline{H}_l \underline{c}_l + \underline{n}_l, \text{ for } l = 0, 1, 2, \ldots, N_F - 1, \qquad \text{Eq (4)}$$

where $\underline{r}_l = [r_{1,l} r_{2,l} \ldots r_{N_R,l}]^T$ is a vector of $N_R$ modulation symbols received $N_R$ receive antennas for the l-th frequency subchannel;

$\underline{H}_l$ is the $N_R \times N_T$ matrix of channel gains $\{h_{n,m}\}$ for the l-th frequency subchannel, where $h_{n,m,l}$ denotes the complex channel gain between the n-th transmit antenna and the m-th receive antenna for the l-th frequency subchannel;

$\underline{c}_l = [c_{1,l} c_{2,l} \ldots c_{N_T,l}]^T$ is a vector of $N_T$ modulation symbols transmitted from the $N_T$ transmit antennas for the l-th frequency subchannel;

$\underline{n}_l = [n_{1,l} n_{2,l} \ldots n_{N_R,l}]^T$ is a vector of $N_R$ noise samples for the $N_R$ receive antennas for the l-th frequency subchannel; and "T" denotes the transposition.

The modulation symbols received from all $N_F$ frequency subchannels of all $N_R$ receive antennas for each time index may be expressed as:

$$\underline{r} = [\underline{r}_0^T \underline{r}_1^T \ldots \underline{r}_{N_F-1}^T]^T. \qquad \text{Eq (5)}$$

The $N_F \cdot N_R$ received modulation symbols in $\underline{r}$ correspond to the $N_F \cdot N_T$ transmitted modulation symbols, which may be expressed as:

$$\underline{c} = [\underline{c}_1^T \underline{c}_2^T \ldots \underline{c}_{N_T}^T]^T. \qquad \text{Eq (6)}$$

As noted above, each modulation symbol is formed by a respective group of q coded bits. The $N_F \cdot N_R$ received modulation symbols in $\underline{r}$ thus further correspond to the $N_F \cdot N_T \cdot q$ transmitted coded bits, which may be expressed as:

$$\underline{b} = [\underline{b}_1^T, \underline{b}_2^T, \ldots, \underline{b}_{N_T}^T]^T, \qquad \text{Eq (7)}$$

where the coded bits transmitted from the n-th transmit antenna may be expressed as $$\underline{b}_n = [b_{n,0,1} \ldots b_{n,0,q} b_{n,1,1} \ldots b_{n,1,q} \ldots b_{n,N_F-1,1} \ldots b_{n,N_F-1,q}]^T.$$

The detector computes the LLRs for each transmitted coded bit $b_{n,l,i}$, as follows:

$$L(b_{n,l,i}) = \ln \frac{Pr\{b_{n,l,i} = +1 \mid \underline{r}\}}{Pr\{b_{n,l,i} = -1 \mid \underline{r}\}}, \qquad \text{Eq (8)}$$

for $n = 1, 2, \ldots, N_T$, $l = 0, 1, \ldots, N_F - 1$, and $i = 1, 2, \ldots, q$.

As shown in equation (8), the LLR for a given coded bit, $L(b_{n,l,i})$, is computed as the (natural) logarithm of the ratio of the probability of the coded bit $b_{n,l,i}$ being a +1 given the received modulation symbols $\underline{r}$, $Pr\{b_{n,l,i} = +1 | \underline{r}\}$, over the probability of the coded bit $b_{n,l,i}$ being a −1 given the received modulation symbols $\underline{r}$, $Pr\{b_{n,l,i} = -1 | \underline{r}\}$. The probabilities for each coded bit are derived based on the received modulation symbol containing that bit and the sequence of coded bits received for $\underline{r}$, as derived below.

The following equalities may be expressed:

$$Pr\{b_{n,l,i} = \pm 1 \mid \underline{r}\} Pr\{\underline{r}\} = \sum_{\underline{b}:b_{n,l,i}=\pm 1} Pr\{\underline{r},\underline{b}\} = \sum_{\substack{\underline{c}:\underline{c}=f(\underline{b}) \\ b_{n,l,i}=\pm 1}} Pr\{\underline{r},\underline{c}\} = \sum_{\substack{\underline{c}:\underline{c}=f(\underline{b}) \\ b_{n,l,i}=\pm 1}} Pr\{\underline{r} \mid \underline{c}\} Pr\{\underline{c}\}, \quad \text{Eq (9)}$$

where $f(\cdot)$ represents the symbol mapping from the coded bits $\underline{b}$ to the modulation symbols $\underline{c}$. The LLRs may then be expressed as:

$$L(b_{n,l,i}) = \ln \frac{\sum_{\substack{\underline{c}:\underline{c}=f(\underline{b}) \\ b_{n,l,i}=+1}} Pr\{\underline{r} \mid \underline{c}\} Pr\{\underline{c}\}}{\sum_{\substack{\underline{c}:\underline{c}=f(\underline{b}) \\ b_{n,l,i}=-1}} Pr\{\underline{r} \mid \underline{c}\} Pr\{\underline{c}\}}. \quad \text{Eq (10)}$$

In the first iteration of the iterative detection and decoding process, it is assumed that all points in the signal constellation are equally likely. Hence, the term $Pr\{\underline{c}\}$ can be removed from the numerator and denominator of equation (10). In subsequent iterations, however, the only assumption is that the transmitted modulation symbols are independent. Furthermore, since the coded bits that make up the modulation symbols are interleaved, it is assumed that the bit probabilities are independent. Based on these assumptions, the term $Pr\{\underline{c}\}$ may expressed as:

$$Pr\{\underline{c}\} = \prod_{n=1}^{N_T} \prod_{l=0}^{N_F-1} \prod_{i=1}^{q} Pr\{b_{n,l,i}\} = \prod_{p=1}^{N_T N_F q} Pr\{b_p\}, \quad \text{Eq (11)}$$

where a change in notation of variables is made (i.e., $p=\{n,l,i\}$) in the term to the right of the equality to simplify notation.

The received modulation symbols $r_{1,1}, r_{2,1}, \ldots, r_{N_R, N_F-1}$ are conditionally independent given $\underline{c}$. The term $Pr\{\underline{r}|\underline{c}\}$ may then be expressed as:

$$Pr\{\underline{r} \mid \underline{c}\} = \prod_{m=1}^{N_R} \prod_{l=0}^{N_F-1} Pr\{r_{m,l} \mid \underline{c}\} = \quad \text{Eq (12)}$$

$$\prod_{m=1}^{N_R} \prod_{l=0}^{N_F-1} \exp\left(-\frac{1}{2\sigma^2}\left|r_{m,l} - \sum_{n=1}^{N_T} h_{n,m,l} \cdot c_{n,l}\right|^2\right),$$

where $\sigma^2$ is the noise spectral density given by $\sigma^2 = N_0/2$.

Substituting equations (11) and (12) into equation (10), the LLR for the k-th coded bit may then be expressed as:

$$L(b_k) = \ln \frac{\sum_{\substack{\underline{c}:\underline{c}=f(\underline{b}) \\ b_k=+1}} \left[\prod_{m=1}^{N_R}\prod_{l=0}^{N_F-1} \exp\left(-\frac{1}{2\sigma^2}\left|r_{m,l} - \sum_{n=1}^{N_T} h_{n,m,l} \cdot c_{n,l}\right|^2\right)\right] \prod_{p=1}^{N_T N_F q} Pr\{b_p\}}{\sum_{\substack{\underline{c}:\underline{c}=f(\underline{b}) \\ b_k=-1}} \left[\prod_{m=1}^{N_R}\prod_{l=0}^{N_F-1} \exp\left(-\frac{1}{2\sigma^2}\left|r_{m,l} - \sum_{n=1}^{N_T} h_{n,m,l} \cdot c_{n,l}\right|^2\right)\right] \prod_{p=1}^{N_T N_F q} Pr\{b_p\}}, \quad \text{Eq (13)}$$

where $k=\{n,l,i\}$. Equation (13) may further be decomposed as follows:

$$L(b_k) = \frac{\sum_{\substack{\underline{c}:\underline{c}=f(\underline{b}) \\ b_k=+1}} \left[\prod_{m=1}^{N_R}\prod_{l=0}^{N_F-1} \exp(\beta_{m,l}) \prod_{\substack{p=1 \\ p \neq k}}^{N_T N_F q} Pr\{b_p\}\right]}{\sum_{\substack{\underline{c}:\underline{c}=f(\underline{b}) \\ b_k=+1}} \left[\prod_{m=1}^{N_R}\prod_{l=0}^{N_F-1} \exp(\beta_{m,l}) \prod_{\substack{p=1 \\ p \neq k}}^{N_T N_F q} Pr\{b_p\}\right]} + \quad \text{Eq (14)}$$

$$\ln \frac{Pr\{b_k = +1\}}{Pr\{b_k = -1\}},$$

$$= L_e(b_k) + L_a(b_k)$$

where $$\beta_{m,l} = -\frac{1}{2\sigma^2}\left|r_{m,l} - \sum_{n=1}^{N_T} h_{n,m,l} \cdot C_{n,l}\right|^2.$$

As shown in equation (14), the LLR for the k-th coded bit, $L(b_k)$, may be decomposed into two parts. The term $L_a(b_k)$ represents the a priori information for the k-th coded bit computed by the decoder and fed back to the detector. This detector a priori information is expressed in the form of a priori LLRs, which may be expressed as:

$$L_a(b_k) = \ln \frac{Pr\{b_k = +1\}}{Pr\{b_k = -1\}}. \quad \text{Eq (15)}$$

The term $L_e(b_k)$ represents the extrinsic information for the k-th coded bit computed by the detector and fed forward to the decoder. The product of the a priori probabilities, $\Pi Pr\{b_p\}$, in equation (14) may be expressed as:

$$\prod_{\substack{p=1 \\ p \neq k}}^{N_T N_F q} Pr\{b_p\} = C \cdot \exp\left(\prod_{\substack{p=1 \\ p \neq k}}^{N_T N_F q} \frac{1}{2} b_p L_a(b_p)\right) = C \cdot \exp(\alpha), \quad \text{Eq (16)}$$

where C is a constant and $$\alpha = \prod_{p=1, p \neq k}^{N_T N_F q} \frac{1}{2} b_p L_a(b_p).$$

Hence, the detector extrinsic information, $L_e(b_k)$, may be expressed in terms of the detector a priori LLRs, as follows:

$$L_e(b_k) = \ln \frac{\sum_{\substack{\underline{c}:c=f(\underline{b}) \\ b_k=+1}} \left[ \prod_{m=1}^{N_R} \prod_{l=0}^{N_F-1} \exp(\beta_{m,l}) \exp\left( \prod_{\substack{p=1 \\ p \neq k}}^{N_T N_F q} \frac{1}{2} b_p L_a(b_p) \right) \right]}{\sum_{\substack{\underline{c}:c=f(\underline{b}) \\ b_k=-1}} \left[ \prod_{m=1}^{N_R} \prod_{l=0}^{N_F-1} \exp(\beta_{m,l}) \exp\left( \prod_{\substack{p=1 \\ p \neq k}}^{N_T N_F q} \frac{1}{2} b_p L_a(b_p) \right) \right]}. \quad \text{Eq (17)}$$

Since the detector a priori information, $L_a(b_k)$, is known by the decoder, it may be subtracted from $L(b_k)$ by summers 422 in FIG. 4A such that only the detector extrinsic information, $L_e(b_k)$, is provided to the decoder.

It can be seen from equations (13) and (17) that the computational complexity to derive the LLRs for the coded bits grows exponentially with the number of frequency subchannels ($N_F$), the number of transmit antennas ($N_T$), and the size of the signal constellation ($2^q$). Several techniques may be used to reduce the computational burden to derive the coded bit LLRs. Such techniques include the use of interference nulling to isolate each transmitted signal by removing the other interferers and the use of a "dual-maxima" or some other approximation to compute the LLRs. These techniques are described in further detail below.

Without loss of generality, the signal from transmit antenna 1 may be treated as the desired signal and the other signals from the remaining ($N_T-1$) transmit antennas may be treated as interference to the desired signal. With $N_R$ receive antennas, where $N_R \geq N_T$, the ($N_T-1$) interferers may be nulled (or canceled). For each of the $N_F$ frequency subchannels, the vector of $N_R$ modulation symbols, r, (which are received from the $N_R$ receive antennas for the l-th frequency subchannel) may be pre-multiplied by an ($N_R-N_T+1$)×$N_R$ nulling matrix, $\underline{\Theta}_l^{(1)}$, and the resulting vector $\tilde{\underline{r}}_l^{(1)}$ of ($N_R-N_T+1$) elements may be expressed as:

$$\tilde{\underline{r}}_l^{(1)} = \underline{\Theta}_l^{(1)} \underline{r}_l = \underline{\Theta}_l^{(1)} \underline{H}_l \underline{c}_l + \underline{\Theta}_l^{(1)} \underline{n}_l = \underline{\tilde{H}}_l^{(1)} c_{1,l} + \underline{\tilde{n}}_l^{(1)}, \text{ for } l=0, 1, \ldots, N_F-1. \quad \text{Eq (18)}$$

As shown in equation (18), the components from transmit antennas 2, 3, ..., $N_T$ are suppressed in the vector $\tilde{\underline{r}}_l^{(1)}$ and only the component $c_{1,l}$ from desired transmit antenna 1 remains.

The nulling matrices, $\underline{\Theta}_l^{(n)}$, may be determined based on algorithms known in the art. The derivation of the nulling matrix, $\underline{\Theta}_l^{(1)}$, for transmit antenna 1 is briefly described as follows. First, the $N_R \times (N_T-1)$ channel response matrix, $\underline{H}_l^{(1)}$, for transmit antennas 2 through $N_T$ and the $N_R$ receive antennas is determined. A set of ($N_R-N_T+1$) orthonormal vectors $\{v_1^{(1)} v_2^{(1)} \ldots v_{N_R-N_T+1}^{(1)}\}$, whose members are the rows of the nulling matrix, $\underline{\Theta}_l^{(1)}$, is then computed such that $$\underline{\Theta}_l^{(1)} \underline{H}_l^{(1)} = \underline{0},$$

where $\underline{0}$ is the all-zero matrix, and $$\underline{\Theta}_l^{(1)} \underline{\Theta}_l^{(1)*} = \underline{I},$$

where $\underline{\Theta}_l^{(1)*}$ is the Hermitian of $\underline{\Theta}_l^{(1)}$ and $\underline{I}$ is the identity matrix (i.e., a diagonal and zeros elsewhere). Fast algorithms are available for computing the orthonormal vectors, as is known in the art. As indicated by the notation, different nulling matrices are derived for different transmit antennas and different frequency subchannels (i.e., $\underline{\Theta}_l^{(n)}$ (n for n=1, 2, ..., $N_T$, and l=0, 1, ..., $N_F-1$).

Derivation of the nulling matrices for a MIMO system is described in further detail by Vahid Tarokh et al in a paper entitled "Combined Array Processing and Space-Time Coding," IEEE Transactions on Information Theory, Vol. 45, No. 4, May 1999, which is incorporated herein by reference.

After nulling the interference on the desired signal due to the signals from the other ($N_T-1$) transmit antennas, the LLRs for the coded bits from the desired transmit antenna may then be calculated in a similar manner as described above, without regard to the components from the other ($N_T-1$) transmit antennas. For transmit antenna 1, the LLRs for the coded bits transmitted on all $N_F$ frequency subchannels of this transmit antenna, $[b_{1,0,1} \ldots b_{1,0,q} \, b_{1,1,1} \ldots b_{1,1,q} \ldots b_{1,N_F-1,1} \ldots b_{1,F-1,q}]$, may be expressed as:

$$L(b_{1,l,i}) = \ln \frac{Pr\{b_{1,l,i} = +1 \mid \tilde{\underline{r}}^{(1)}\}}{Pr\{b_{1,l,i} = -1 \mid \tilde{\underline{r}}^{(1)}\}}, \quad \text{Eq (19)}$$

for $l = 0, 1, \ldots, N_F - 1$, and $i = 1, 2, \ldots, q$, where $\tilde{\underline{r}}^{(1)} = \left[ \tilde{r}_0^{(1)T} \; \tilde{r}_1^{(1)T} \; \ldots \; \tilde{r}_{N_F-1}^{(1)T} \right]^T$.

After the interference nulling, the LLR computation is simplified since only the desired signal from one transmit antenna is considered at a time. Equation (19) maybe expressed in a form similar to equation (14), as follows:

$$L^{(1)}(b_k) = \ln \frac{\sum_{\substack{\underline{c}_1 : c_1 = f(\underline{b}_1) \\ b_k = +1}} \left[ \prod_{m=1}^{N_R} \prod_{l=0}^{N_F-1} \exp(\beta_{m,l}) \prod_{\substack{p=1 \\ p \neq k}}^{N_F q} Pr\{b_p\} \right]}{\sum_{\substack{\underline{c}_1 : c_1 = f(\underline{b}_1) \\ b_k = -1}} \left[ \prod_{m=1}^{N_R} \prod_{l=0}^{N_F-1} \exp(\beta_{m,l}) \prod_{\substack{p=1 \\ p \neq k}}^{N_F q} Pr\{b_p\} \right]} + \ln \frac{Pr\{b_k = +1\}}{Pr\{b_k = -1\}}, \quad \text{Eq (20)}$$

where k=1, 2, ..., $N_F \cdot q$ and k={m, l}.

As shown in equation (20), instead of calculating ($N_F \cdot N_T \cdot q$) LLR values for all $N_T$ transmit antennas, only ($N_F \cdot q$) LLR values are calculated at a time for each of $N_T$ transmit antennas. However, by performing the interference nulling, the complexity of the calculation in Eq (20) is no longer exponential in the number of transmit antennas $N_T$ since (1) each summation is performed over only the modulation symbols $c_n$ transmitted from the desired n-th transmit antenna, and (2) the term $\pi Pr\{b_p\}$ is evaluated only for the coded bits transmitted from the n-th transmit antenna.

The product of the a priori probabilities, $\pi \Pr\{b_p\}$, in equation (20) may be expressed as:

$$\prod_{\substack{p=1 \\ p\neq k}}^{N_F q} \Pr\{b_p\} = C \cdot \exp\left(\prod_{\substack{p=1 \\ p\neq k}}^{N_F q} \frac{1}{2} b_p L_a(b_p)\right) = C \cdot \exp(\alpha_n). \qquad \text{Eq (21)}$$

The detector extrinsic information, $L_e^{(n)}(b_k)$, may then be expressed in terms of the detector a priori LLRs, as follows:

$$L_e^{(n)}(b_k) = \qquad \text{Eq (22)}$$

$$\ln \frac{\displaystyle\sum_{\substack{\underline{c}_n:\underline{c}_n=f(\underline{b}_n) \\ b_k=+1}} \left[\prod_{m=1}^{N_R}\prod_{l=0}^{N_F-1} \exp(\beta_{m,l})\exp\left(\prod_{\substack{p=1 \\ p\neq k}}^{N_F q}\frac{1}{2}b_p L_a(b_p)\right)\right]}{\displaystyle\sum_{\substack{\underline{c}_n:\underline{c}_n=f(\underline{b}_n) \\ b_k=-1}} \left[\prod_{m=1}^{N_R}\prod_{l=0}^{N_F-1} \exp(\beta_{m,l})\exp\left(\prod_{\substack{p=1 \\ p\neq k}}^{N_F q}\frac{1}{2}b_p L_a(b_p)\right)\right]}.$$

The detection with interference nulling described above may be repeated $N_T$ times, once for each transmit antenna. For each repetition to recover the desired signal from a particular transmit antenna, the $(N_T-1)$ interferers of this desired signal may be nulled out by pre-multiplying the received modulation symbol vectors, $\underline{r}_l$, with the nulling matrix, $\underline{\Theta}_l^{(n)}$, derived for that transmit antenna and that frequency subchannel, as shown in equation (18). The LLRs for the coded bits in the desired signal may then be computed, as shown in equations (20) and (22). Thus, equation (20) or (22) may be evaluated $N_T$ times, once for each desired signal, with each evaluation providing a set of $(N_F \cdot q)$ LLRs for the coded bits in the desired signal.

The reduced computational complexity for deriving the LLRs for the coded bits is achieved with a corresponding decrease in diversity, since the desired signal is received with a diversity of order $(N_R-N_T+1)$, instead of a diversity of order $N_R$, using equation (18).

The dual-maxima approximation may also be used to reduce the computational complexity associated with deriving the LLRs for the coded bits. As shown in equations (20) and (22), the LLR for each coded bit is computed as the logarithm of the ratio of two summations. Each summation is performed over a number of elements, with each such element being composed of products of exponential terms, $\exp(\beta_{m,l})$ and $\exp(\alpha_n)$. The exponentiation in the elements of each summation enhances the differences between the individual elements of the summation. Hence, one element typically dominates each summation, and the following approximation may be made:

$$\ln \sum_j \exp(a_j) \approx \max_j(a_j). \qquad \text{Eq (23)}$$

For simplicity, the following may be defined:

$$L_k = \ln \frac{\displaystyle\sum_{\underline{u}:u_k=+1} \exp[M(\underline{u},\underline{y})]}{\displaystyle\sum_{\underline{u}:u_k=-1} \exp[M(\underline{u},\underline{y})]} \qquad \text{Eq (24)}$$

$$= \ln \sum_{\underline{u}:u_k=+1} \exp[M(\underline{u},\underline{y})] - \ln \sum_{\underline{u}:u_k=-1} \exp[M(\underline{u},\underline{y})].$$

Applying the approximation shown in equation (23) for the sum of exponents to equation (24), the following can be expressed:

$$L_k \approx \max_{\underline{u}:u_k=+1}\{M(\underline{u},\underline{y})\} - \max_{\underline{u}:u_k=-1}\{M(\underline{u},\underline{y})\}. \qquad \text{Eq (25)}$$

The approximation shown in equation (25) is often referred to as the dual-maxima approximation.

The dual-maxima approximation may be used to simplify the computation for the LLRs for the coded bits. Specifically, for equation (22), the logarithm of the ratio of two summations may first be decomposed as follows:

$$L_e^{(n)}(b_k) = \ln \sum_{\substack{\underline{c}_n \\ b_k} : \underline{c}_n=f(\underline{b}_n) \\ =+1} \left[\prod_{m=1}^{N_R}\prod_{l=0}^{N_F-1} \exp(\beta_{m,l})\exp(\alpha_n)\right] \qquad \text{Eq (26)}$$

$$- \ln \sum_{\substack{\underline{c}_n \\ b_k} : \underline{c}_n=f(\underline{b}_n) \\ =-1} \left[\prod_{m=1}^{N_R}\prod_{l=0}^{N_F-1} \exp(\beta_{m,l})\exp(\alpha_n)\right].$$

Next, instead of summing over the individual elements for all possible values of the coded bits for the modulation symbols $\underline{c}_n$ from the n-th transmit antenna, the dual-maxima approximation algorithm finds the maximum element in each summation (i.e., one for the numerator and another for the denominator in equation (22)) and uses these two maximum elements in the LLR calculation, as shown in equation (25).

By using approximations based on the dual-maxima approximation, the computational complexity can be made to increase linearly in the number of coded bits per modulation symbol, q, instead of exponentially. Simulation results have shown that the performance degradation due to the use of such approximations is negligible over the range of SNRs where the use of high-order modulations is justified.

Other approximations and simplifications may also be used to reduce the number of complex additions and multiplications needed to compute the LLRs for the coded bits, and this is within the scope of the invention.

Other simplifications that may be used for computing LLRs are described by Andrew J. Viterbi in a paper entitled "An Intuitive Justification and a Simplified Implementation of the MAP Decoder for Convolutional Codes," IEEE Journal on Selected Areas in Communications, Vol. 16, No. 2, February 1998, pp. 260-264, and by Patrick Robertson et al. in a paper entitled "A Comparison of Optimal and Sub-Optimal MAP Decoding Algorithms Operating in the Log Domain," IEEE International Conference on Communication, 1995, pp. 1009-1012, both of which are incorporated herein by reference. These various simplification techniques typically perform computations in the log-domain, where division becomes subtraction and multiplication becomes addition.

Figure 4B:
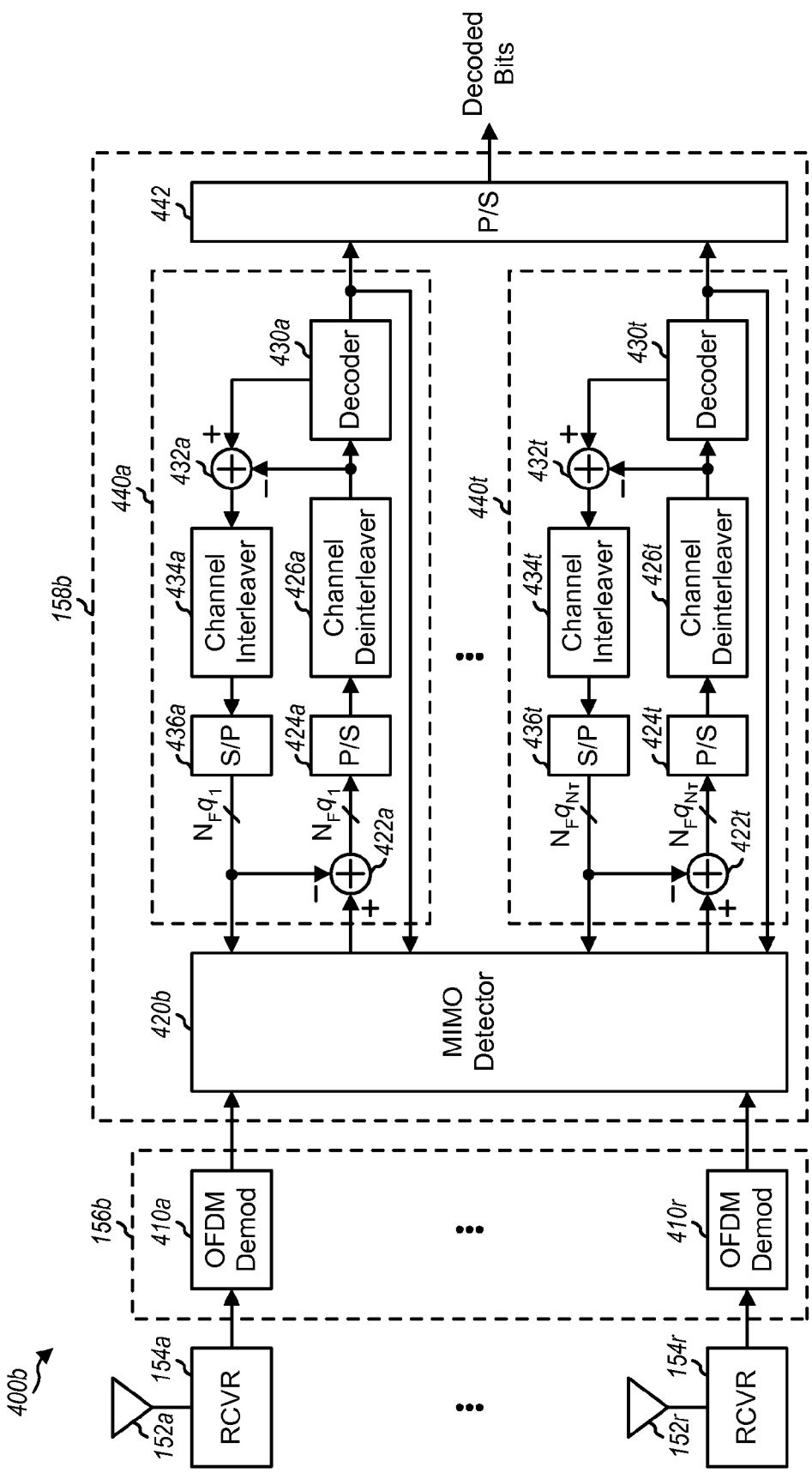

FIG. 4B is a block diagram of an embodiment of a receiver unit 400b, which is another embodiment of the receiver portion of receiver system 150 in FIG. 1. In this embodiment, different demodulation and decoding schemes may be used for the $N_T$ transmit antennas. Receiver unit 400b may thus be used to receive a data transmission from transmitter unit 200b in FIG. 2B, which employs separate coding and modulation schemes on a per-antenna basis.

The signals transmitted from the $N_T$ transmit antennas are initially received by each of $N_R$ antennas 152a through 152r and routed to a respective receiver 154. Each receiver 154 conditions, digitizes, and processes a respective received signal to provide a respective stream of transmission symbols. The transmission symbol stream from each receiver 154 is provided to a respective OFDM demodulator 410 within a demodulator 156b. Each OFDM demodulator 410 removes the cyclic prefix appended to each OFDM symbol by the transmitter system and then transforms each received OFDM symbol to provide a vector of $N_F$ received modulation symbols for the $N_F$ frequency subchannels used to transmit the OFDM symbol. The $N_R$ modulation symbol vectors from all $N_R$ OFDM demodulators 410 for each transmission symbol period are provided to a detector/decoder 158b, which is another embodiment of detector/decoder 158 in FIG. 1.

In the embodiment shown in FIG. 4B, detector/decoder 158b includes a detector 420b and $N_T$ decoder blocks 440, which collectively perform iterative detection and decoding on the modulation symbols received from all $N_R$ receive antennas to provide the decoded data. Each decoder block 440 is assigned to process the modulation symbols transmitted from a respective transmit antenna, which may have been coded and modulated with its own specific coding and modulation schemes.

Detector 420b receives the modulation symbols from demodulator 156b and the a priori information from the $N_T$ decoders 430a through 430t and provides soft-decision symbols for the $N_T$ transmit antennas, with each such soft-decision symbol being an estimate of a transmitted coded bit and may be represented by the LLR, as shown in equation (22). For each transmission symbol period, detector 420b provides $N_T$ vectors of soft-decision symbols for the $N_T$ transmit antennas to the $N_T$ decoder blocks 440, with each vector including ($N_F \cdot q_n$) soft-decision symbols (where $q_n$ is dependent on the specific modulation scheme used for the n-th transmit antenna). Within each decoder block 440, the detector a priori information for each coded bit being processed by that decoder block is subtracted from the corresponding soft-decision symbol to derive the extrinsic information for the coded bit. The detector extrinsic information for all ($N_F \cdot q_n$) coded bits is then converted from parallel to serial by P/S converter 424, deinterleaved by channel deinterleaver 426, and provided as a priori information to decoder 430.

Decoder 430 within each decoder block 440 uses the decoder a priori information in the decoding process and provides the decoded data for the transmit antenna assigned to and processed by the decoder block. Decoder 430 further provides the a posteriori information for the coded bits transmitted by the assigned transmit antenna. A summer 432 then subtracts the decoder a priori information from the decoder a posteriori information to derive the decoder extrinsic information, which is then interleaved by channel interleaver 434, converted from serial to parallel by S/P converter 436, and provided as a priori information to detector 420b and summer 422.

Similar to that described for FIG. 4A, the detection and decoding process may be iterated a number of times. During the iterative detection and decoding process, the reliability of the bit decisions is improved with each iteration.

Figure 4C:
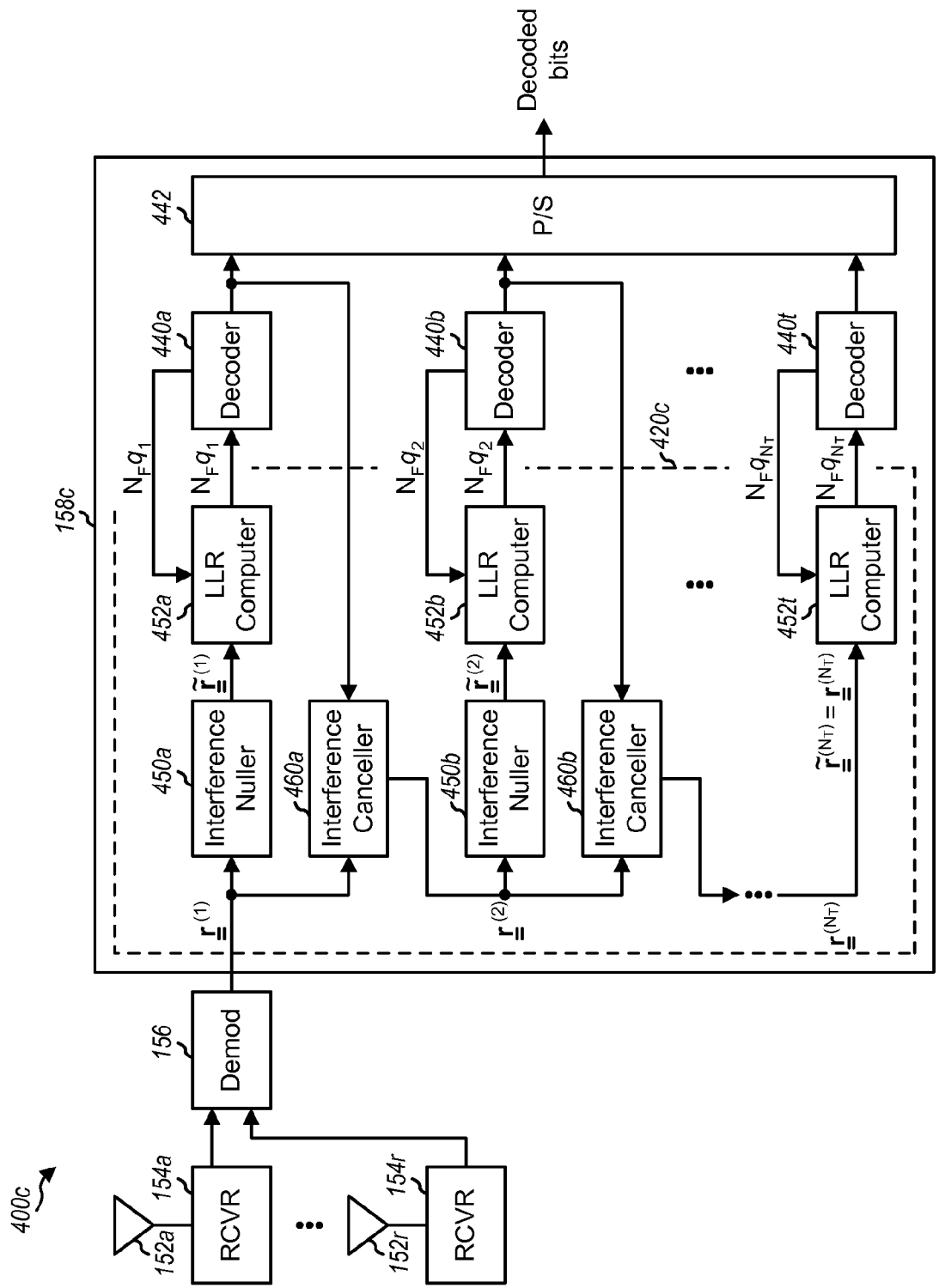
FIG. 4C is a block diagram of a receiver unit that performs successive nulling and interference cancellation to recover one transmitted signal at a time.

FIG. 4C is a block diagram of an embodiment of a receiver unit 400c, which is yet another embodiment of the receiver portion of receiver system 150 in FIG. 1. In this embodiment, the detector performs successive nulling and interference cancellation to recover one transmitted signal at a time. Receiver unit 400c may be used to recover a data transmission from transmitter unit 200b in FIG. 2B (which employs separate coding and modulation schemes on a per-antenna basis).

The $N_R$ received signals are initially processed by receivers 154 and further processed by demodulator 156 to provide $N_R$ modulation symbol vectors, $\underline{r}$, for each transmission symbol period, which are then provided to a detector/decoder 158c. Detector/decoder 158c performs iterative detection and decoding as well as successive nulling and interference cancellation. In particular, detector/decoder 158c implements a multi-stage (or multi-layer) detection scheme that includes both nulling of interferers and post-decoding interference cancellation (i.e., successive nulling and interference cancellation).

Detector/decoder 158c includes a detector 420c, $N_T$ decoder blocks 440, and P/S converter 442. Detector 420c includes $N_T$ detection stages (or layers), with each stage being assigned to process and recover the data for a particular transmit antenna. Each stage (except for the last stage) includes an interference nuller 450, an LLR computer 452, and an interference canceller 460. The last stage only includes LLR computer 452 since all other transmitted signals have been nulled by this time.

Within detector 420c, the received modulation symbol vectors $\underline{r}$ are provided as the input vectors $\underline{r}^{(1)}$ for interference nuller 450a, which pre-multiplies the modulation symbol vector $\underline{r}_l^{(1)}$ for each frequency subchannel with the nulling matrix $\underline{\Theta}_l^{(1)}$ for that frequency subchannel of the first transmit antenna to provide the vector $\underline{\tilde{r}}_l^{(1)}$ having the components from the other ($N_T$−1) transmit antennas approximately removed. The pre-multiplication may be performed as shown in equation (18), which is:

$$\underline{\tilde{r}}_l^{(1)} = \underline{\Theta}_l^{(1)} \underline{r}_l = \underline{\Theta}_l^{(1)} \underline{H}_l \underline{c} + \underline{\Theta}_l^{(1)} \underline{n}_l.$$

Interference nuller 450a performs $N_F$ pre-multiplications to derive $N_F$ vectors, $\underline{\tilde{r}}^{(1)} = [\underline{\tilde{r}}_0^{(1)T} \underline{\tilde{r}}_1^{(1)T} \ldots \underline{\tilde{r}}_{N_F-1}^{(1)T}]^T$, for the $N_F$ frequency subchannels of the first transmit antenna.

The vectors $\underline{\tilde{r}}^{(1)}$ are then provided to LLR computer 452a, which computes the LLRs for the coded bits transmitted from the first transmit antenna, as shown in equation (22). The LLRs for the ($N_F \cdot q_1$) coded bits from the first transmit antenna are then provided to decoder block 440a, which operates on the decoder a priori information to provide the detector a priori information and the decoded bits for the first transmit antenna, as described below. The detector a priori information from decoder block 440a is provided back to LLR computer 452a and used to compute the new decoder a priori information for the next iteration. The detection and decoding for the first transmit antenna may be iterated a number of times.

The decoded bits from decoder block 440a are also provided to interference canceller 460a. Assuming that the data for the first stage has been decoded correctly, the contribution of these decoded bits on the received modulation symbols (which is denoted as $\hat{\underline{i}}^{(1)}$) is derived and subtracted from that stage's input vectors $\underline{r}^{(1)}$ to derive the input vectors $\underline{r}^{(2)}$ for the next stage. This interference cancellation may be expressed as:

$$\underline{r}^{(2)} = \underline{r}^{(1)} - \hat{\underline{i}}^{(1)}. \qquad \text{Eq (27)}$$

Each subsequent stage performs the detection and decoding in a similar manner as described above for the first stage to provide the decoded bits for the assigned transmit antenna. However, the input vectors, $\underline{r}^{(n)}$, for each subsequent stage contain less interference than that of the previous stage. Also, since the nulling is performed by interference nuller 450 using the modulation symbols from all $N_R$ receive antennas, the diversity order increases by one from one stage to the next. Finally, in the last stage, only the signal contribution from the last ($N_T$-th) transmit antenna remains, if the interference cancellation was effectively performed in the preceding stages. Hence, no nulling is necessary and the iterative detection and decoding may be performed directly on that stage's input vectors $\underline{r}^{(N_T)}$.

Pre-decoding interference estimation and cancellation may also be used, and this is within the scope of the invention. In this case, a hard decision may be made on the LLR outputs from the detector. The hard decision may then be re-modulated and multiplied with the estimated channel response to obtain pre-decoding interference estimates (which are typically not as reliable as post-decoding interference estimates). The pre-decoding interference estimates may then be canceled from the received modulation symbols.

Decoders

Decoders 430 in FIGS. 4A and 4B may be implemented based on various designs and may be dependent on the particular coding scheme(s) used at the transmitter system. For example, each decoder 430 may be implemented as an iterative decoder (i.e., a Turbo decoder) if a Turbo code is used. The structures for the Turbo decoders for serial and parallel concatenated convolutional codes are described below.

Figure 5A:
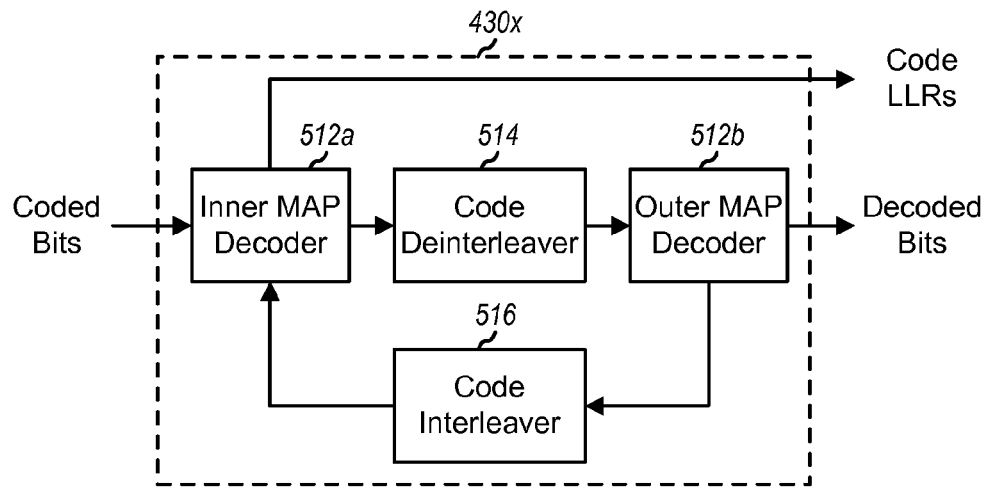
FIGS. 5A and 5B are block diagrams of two Turbo decoders capable of performing iterative decoding for serial and parallel concatenated convolutional codes, respectively.

FIG. 5A is a simplified block diagram of a Turbo decoder 430x capable of performing iterative decoding for serial concatenated convolutional codes, such as the one shown in FIG. 3A. Turbo decoder 430x includes inner and outer maximum a posteriori (MAP) decoders 512a and 512b, a code deinterleaver 514, and a code interleaver 516.

The coded bits (or more specifically, the a priori LLRs for the decoder, $L_a^D(b_k)$) are provided to inner MAP decoder 512a, which derives the a posteriori information for the coded bits based on the inner convolutional code. The a posteriori information is then subtracted by the a priori information for MAP decoder 512a to provide extrinsic information, $e_k^{s1}$, which is indicative of corrections/adjustments in the confidence of the values for the information bits. The extrinsic information is then deinterleaved by code deinterleaver 514 and provided as a priori information to outer MAP decoder 512b. MAP decoder 512a also provides the LLRs for the coded bits, which comprise the a posteriori information, $L^D(b_k)$, that is provided to summer 432 in FIGS. 4A and 4B.

MAP decoder 512b receives the a priori information from MAP decoder 512a (after the code deinterleaving) and derives the a posteriori information for the coded bits based on the outer convolutional code. The a posteriori information is subtracted by the a priori information for MAP decoder 512b to provide extrinsic information, $e_k^{e2}$, which is indicative of further corrections/adjustments in the confidence of the values for the information bits. The extrinsic information, $e_k^{s2}$, is then interleaved by code interleaver 516 and provided to inner MAP decoder 512a.

The decoding by inner and outer MAP decoders 512a and 512b may be iterated a number of times (e.g., 8, 12, 16, or possibly more). With each iteration, greater confidence is gained for the detected values of the information bits. After all the decoding iterations have been completed, the final LLRs for the information bits are provided to a bit detector within MAP decoder 512b and sliced to provide the decoded bits, which are hard-decision (i.e., "0" or "1") values for the information bits.

MAP decoders 512a and 512b may be implemented with the well-known BCJR soft-input soft-output MAP algorithm or its lower complexity derivatives. Alternatively, the soft-output Viterbi (SOV) algorithm may be implemented instead of the MAP algorithms. MAP decoders and MAP algorithms are described in further detail in the aforementioned papers by Viterbi and Robertson. The MAP and SOV algorithms may also be used to decode simple convolutional codes. The complexity of these algorithms is comparable to the standard Viterbi decoding algorithm, multiplied by the number of iterations.

Figure 5B:
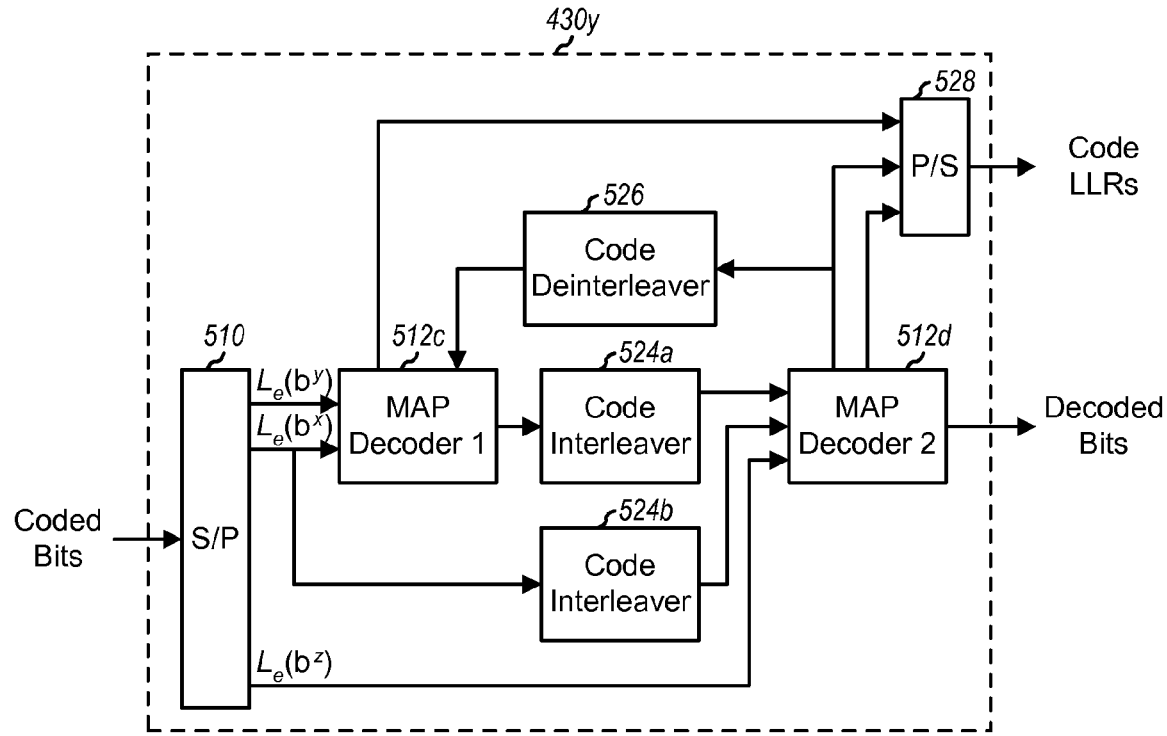

FIG. 5B is a simplified block diagram of a Turbo decoder 430y capable of performing iterative decoding for parallel concatenated convolutional codes, such as the one shown in FIG. 3B. Turbo decoder 430y includes a S/P converter 510, two MAP decoders 512c and 512d, two code interleavers 524a and 524b, a code deinterleaver 526, and a P/S converter 528.

The coded bits (or more specifically, the a priori LLRs for the decoder, $L_a^D(b_k)$) are provided to S/P converter 510, which provides the a priori LLRs for the information bits, $L_a^D(b_k^x)$, to MAP decoder 512c and code interleaver 524b, the a priori LLRs for the first constituent encoder's parity bits, $L_a^D(b_k^y)$, to MAP decoder 512c, and the a priori LLRs for the second constituent encoder's parity bits, $L_a^D(b_k^z)$, to code interleaver 524b, where $L_a^D(b_k) = \{L_a^D(b_k^x), L_a^D(b_k^y), L_a^D(b_k^z)\}$ MAP decoder 512c receives the a priori LLRs for the information bits, $L_a^D(b_k^x)$, the a priori LLRs for the first constituent encoder's parity bits, $L_a^D(b_k^y)$, and extrinsic information from MAP decoder 512d, $e_k^{p2}$ (after deinterleaving by code deinterleaver 526). MAP decoder 512c then derives the a posteriori information for the information bits based on the first constituent convolutional code. This a posteriori information is then subtracted by the received a priori information to provide extrinsic information, $e_k^{p1}$, which is indicative of corrections/adjustments in the confidence of the values for the information bits determined from the first constituent encoder's parity bits. The extrinsic information is then interleaved by code interleaver 524a and provided to MAP decoder 512d.

MAP decoder 512d receives the a priori LLRs for the information bits, $L_a^D(b_k^x)$ (after interleaving by code interleaver 524b), the a priori LLRs for the second constituent encoder's parity bits, $L_a^D(b_k^z)$, and the extrinsic information from MAP decoder 512c, $e_k^{p1}$ (after interleaving by code interleaver 524a). MAP decoder 512d then derives the a posteriori information for the information bits based on the second constituent convolutional code. This a posteriori information is then subtracted by the received extrinsic information, $e_k^{p1}$, to provide the extrinsic information, $e_k^2$, which is indicative of further corrections/adjustments in the confidence of the values for the information bits determined from the second constituent encoder's parity bits. The extrinsic information, $e_k^2$, is then deinterleaved by code deinterleaver 526 and provided to MAP decoder 512c.

P/S converter 528 receives the first constituent encoder's parity bit LLRs from MAP decoder 512c, the second constituent encoder's parity bit LLRs from MAP decoder 512d, and the information bit LLRs from MAP decoder 512d. P/S converter 528 then performs parallel-to-serial conversion of the received LLRs and provides the a posteriori information, $L^D(b_k)$, to summer 432 in FIGS. 4A and 4B.

The decoding by MAP decoders 512c and 512d may also be iterated a number of times (e.g., 8, 12, 16, or possibly more). After all the decoding iterations have been completed, the final LLRs for the information bits are provided to a bit detector within MAP decoder 512d and sliced to provide the decoded bits. MAP decoders 512c and 512d may be implemented with the BCJR SISO MAP algorithm or its lower complexity derivatives or with the SOV algorithm.

In general, the number of iterations in both the decoder and the iterative detector-decoder can be fixed or variable (i.e., adaptive). In the latter case, the stop criterion may be triggered when (1) the BER converges or reaches an acceptable level, (2) the worse or average LLR reaches a particular confidence level, or (3) some other criterion is met.

Interference Cancellation

Figure 6:
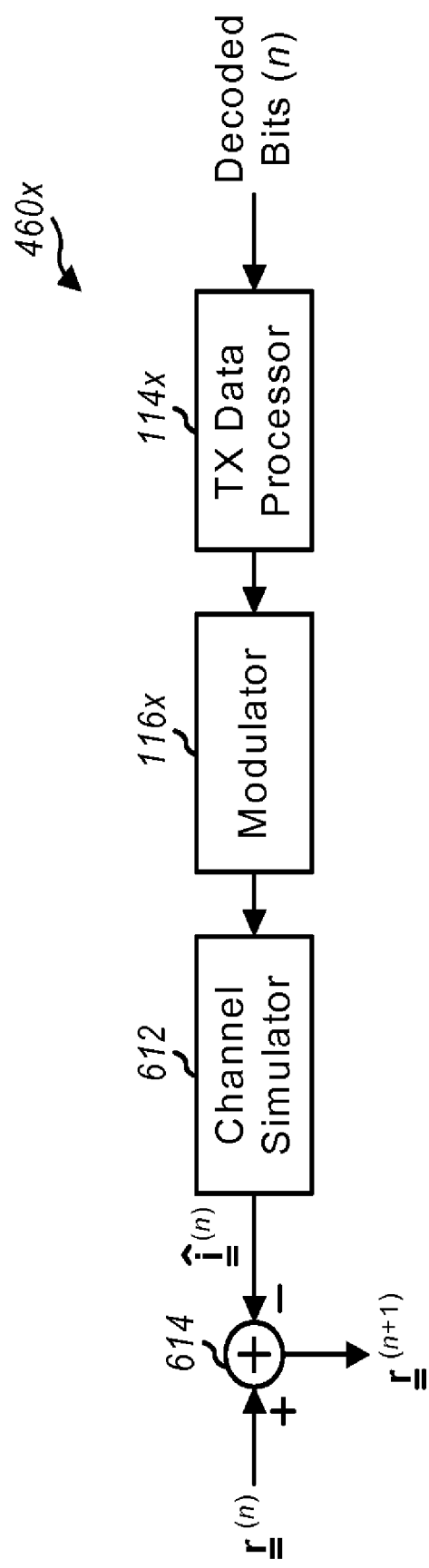
FIG. 6 is a block diagram of an interference canceller that may be used for the receiver unit in FIG. 4C.

FIG. 6 is a block diagram of an embodiment of an interference canceller 460x, which may be used for each interference canceller 460 in FIG. 4C. Within interference canceller 460x, the decoded bits from the decoder block 440 for the same stage are re-encoded and channel interleaved by a TX data processor 114x to provide re-encoded bits for the transmit antenna being processed by the stage (i.e., the assigned transmit antenna). The re-encoded bits are further symbol mapped by a modulator 116x to provide remodulated symbols, which are estimates of the modulation symbols at the transmitter prior to the OFDM processing and channel distortion. TX data processor 114x and modulator 116x each performs the same processing (e.g., encoding, channel interleaving, and modulation) as that performed at the transmitter system for the data stream on the assigned transmit antenna. The remodulated symbols are then provided to a channel simulator 612, which processes the symbols with the estimated channel response to provide estimates of the interference due to the decoded bits.

For each frequency subchannel, channel simulator 612 multiples the remodulated symbols for the assigned n-th transmit antenna with a vector $\hat{h}_{n,l}$ that includes an estimate of the channel response between the n-th transmit antenna and each of the $N_R$ receive antennas. The vector $\hat{h}_{n,l}$ is one column of the estimated channel response matrix $\hat{H}_l$ for the l-th frequency subchannel. The matrix $\hat{H}_l$ may be determined by a channel estimator associated with the same stage and provided to channel simulator 612.

If the remodulated symbol corresponding to the n-th transmit antenna is expressed as $\tilde{c}_{n,l}$, then the estimated interference component $\hat{i}_l^{(n)}$ due to the symbol from the n-th transmit antenna may be expressed as:

$$\hat{i}_l^{(n)} = \begin{bmatrix} \hat{h}_{n,1,l} \cdot \tilde{c}_{n,l} \\ \hat{h}_{n,2,l} \cdot \tilde{c}_{n,l} \\ \vdots \\ \hat{h}_{n,N_R,l} \cdot \tilde{c}_{n,l} \end{bmatrix}. \qquad \text{Eq (28)}$$

The $N_R$ elements in the interference vector $\hat{i}_l^{(n)}$ correspond to components in the input vector $\underline{r}_l^{(n)}$ due to the modulation symbol $\tilde{c}_{n,l}$ transmitted from the n-th transmit antenna. The interference vectors for all $N_F$ frequency subchannels may be formed as $\hat{i}^{(n)} = [\hat{i}_0^{(n)T} \hat{i}_1^{(n)T} \ldots \hat{i}_{F-1}^{(n)T}]^T$. The components in the vectors $\hat{i}^{(n)}$ are interference to the remaining (not yet detected) modulation symbols from the other transmit antennas which are also included in the input vectors r(n). The interference vectors $\hat{i}^{(n)}$ are then subtracted from the input vectors $\hat{r}^{(n)}$ by a summer 614 to provide modified vectors $\hat{r}^{(n+1)}$ having the interference components from the decoded bits removed. This cancellation can be expressed as shown above in equation (27). The modified vectors $\hat{r}^{(n+1)}$ are provided as the input vectors to the next processing stage, as shown in FIG. 4C.

The successive cancellation receiver processing technique is described in further detail in the aforementioned U.S. patent application Ser. Nos. 09/854,235 and by P. W. Wolniansky et al. in a paper entitled "V-BLAST: An Architecture for Achieving Very High Data Rates over the Rich-Scattering Wireless Channel", Proc. ISSSE-98, Pisa, Italy, which is incorporated herein by reference.

Deriving and Reporting Channel State Information

In FIG. 1, a channel estimator within demodulator 156 may process the received OFDM symbols and derive estimates of one or more characteristics of the communication channel, such as the channel frequency response, the channel noise variance, the SNR of the received symbols, and so on. Detector/decoder 158 may also derive and provide the status of each received packet and may further provide one or more other performance metrics indicative of the decoded results. These various types of information may be provided to controller 170.

Controller 170 may determine or select a particular "rate" to be used for all transmit antennas, for each transmit antenna, for each subset of transmit antennas, for each transmission channel, or for each group of transmission channels based on the various types of information received from demodulator 156 and detector/decoder 158. The rate is indicative of a set of specific values for a set of transmission parameters. For example, the rate may indicate (or may be associated with) a specific data rate to be used for the data transmission, a specific coding scheme and/or code rate, a specific modulation scheme, and so on. Channel state information (CSI) in the form of the selected rate, the channel response estimates, and/or other information may be provided by controller 170, processed by an encoder 180, modulated by a modulator 182, and conditioned and transmitted by one or more transmitters 154 back to transmitter system 110. Various forms of CSI are described in the aforementioned U.S. patent application Ser. No. 09/993,087.

At transmitter system 110, the one or more modulated signals from receiver system 150 are received by antennas 124, conditioned by receivers 122, demodulated by a demodulator 140, and decoded by a decoder 142 to recover the channel state information transmitted by the receiver system. The channel state information is then provided to controller 130 and used to control the processing of the data transmission to the receiver system. For example, the data rate of the data transmission may be determined based on the selected rate provided by the receiver system, or may be determined based on the channel response estimates provided by the receiver system. The specific coding and modulation schemes associated with the selected rate are determined and reflected in the coding and modulation control provided by controller 130 to TX data processor 114 and modulator 116.

The iterative detection and decoding techniques have been described specifically for serial and parallel concatenated convolutional codes. These techniques may also be used with other codes, such as convolutional codes, block codes, concatenated codes of different types (e.g., a convolutional code with a block code), and so on. Furthermore, the iterative detection and decoding techniques have been described specifically for a MIMO-OFDM system. These techniques may also be used for a MIMO system that does not implement OFDM, an OFDM system that does not utilize MIMO, or some other wireless communication systems (e.g., a wireless LAN system).

The iterative detection and decoding techniques may be implemented in various units in a wireless communication system, such as in a terminal, a base station, an access point, and so on.

The iterative detection and decoding techniques described herein may be implemented by various means. For example, these techniques may be implemented in hardware, software, or a combination thereof. For a hardware implementation, the elements used to perform the iterative detection and decoding (e.g., detector 420 and decoder(s) 430) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the iterative detection and decoding may be performed with modules (e.g., procedures, functions, and so on) that perform the computations and functions described herein. The software codes may be stored in a memory unit (e.g., memory 172 in FIG. 1) and executed by a processor (e.g., controller 170). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting data in a wireless communication system, comprising:

receiving channel state information (CSI) indicative of one or more characteristics of a communication channel used for data transmission;

selecting one or more coding schemes and one or more modulation schemes used for the data transmission based on the received CSI;

processing data based on the one or more selected coding schemes to provide coded data;

modulating the coded data based on the one or more selected modulation schemes to provide a plurality of modulation symbol streams; and generating a plurality of modulated signals for the plurality of modulation symbol streams, and wherein the CSI is derived at one or more receivers based on iterative detection and decoding of the plurality of modulated signals as received at the one or more receivers, iterative detection and decoding comprises deriving decoder a priori information for the coded data based on the received modulation signals and detector a priori information for the coded data; and decoding the decoder a priori information to derive the detector a priori information, the detector a priori information comprises decoded information for the coded data subtracted by the decoder a priori information.

2. The method of claim 1, further comprising:
interleaving the coded data based on one or more interleaving schemes, and wherein the interleaved data is modulated.

3. A transmitter in a wireless communication system, comprising:

a TX data processor operative to process data based on one or more coding schemes to provide coded data; and a modulator operative to modulate the coded data based on one or more modulation schemes to provide a plurality of modulation symbol streams, and to generate a plurality of modulated signals for the plurality of modulation symbol streams, and wherein the coding and modulation schemes are selected based on channel state information (CSI) derived at one or more receivers based on iterative detection and decoding of the plurality of modulated signals as received at the one or more receivers, iterative detection and decoding comprises deriving decoder a priori information for the coded data based on the received modulation signals and detector a priori information for the coded data; and decoding the decoder a priori information to derive the detector a priori information, the decoder a priori information comprises decoded information for the coded data subtracted by the detector a priori information.

4. The transmitter of claim 3, wherein the TX data processor is further operative to interleave the coded data based on one or more interleaving schemes, and wherein the interleaved data is modulated by the modulator.

5. The transmitter of claim 4, wherein one interleaving scheme is used for each modulation symbol stream.

6. The transmitter of claim 4, wherein one interleaving scheme is used for each group of one or more modulation symbol streams.

7. The transmitter of claim 4, wherein the coded data is interleaved over time and space.

8. The transmitter of claim 4, wherein the coded data is interleaved over time, frequency, and space.

9. The transmitter of claim 4, further comprising:
a controller operative to receive the CSI and to select the coding, interleaving, and modulation schemes based on the received CSI.

10. The transmitter of claim 4, wherein a separate coding scheme, a separate interleaving scheme, and a separate modulation scheme are used for each of the plurality of modulated signals.

11. The transmitter of claim 4, wherein a common coding scheme, a common interleaving scheme, and a common modulation scheme are used for the plurality of modulated signals.

12. The transmitter of claim 3, further comprising:
a controller operative to receive the CSI and to select the coding and modulation schemes based on the received CSI.

13. The transmitter of claim 3, wherein the one or more coding schemes comprise a parallel concatenated convolutional code.

14. The transmitter of claim 3, wherein the one or more coding schemes comprise a serial concatenated convolutional code.

15. The transmitter of claim 3, wherein the one or more coding schemes comprise a convolutional code.

16. The transmitter of claim 3, wherein the one or more coding schemes comprise a block code.

17. The transmitter of claim 3, wherein the one or more modulation schemes are non-Gray modulation schemes.

18. The transmitter of claim 3, wherein the one or more modulation schemes are anti-Gray modulation schemes.

19. The transmitter of claim 3, wherein a separate coding scheme and a separate modulation scheme are used for each of the plurality of modulated signals.

20. The transmitter of claim 3, wherein a common coding scheme and a common modulation scheme are used for the plurality of modulated signals.

21. A transmitter apparatus in a wireless communication system, comprising: means for processing data based on one or more coding schemes to provide coded data;
means for modulating the coded data based on one or more modulation schemes to provide a plurality of modulation symbol streams;
means for generating a plurality of modulated signals for the plurality of modulation symbol streams, and
wherein the coding, interleaving and modulation schemes are selected based on channel state information (CSI) derived at one or more receivers based on iterative detection and decoding of the plurality of modulated signals as received at the one or more receivers, iterative detection and decoding comprises deriving decoder a priori information for the coded data based on the received modulation signals and detector a priori information for the coded data; and
decoding the decoder a priori information to derive the detector a priori information, the detector a priori information comprises decoded information for the coded data subtracted by the decoder a priori information.

22. The transmitter apparatus of claim 21, further comprising:
means for interleaving the coded data based on one or more interleaving schemes to provide a plurality of coded and interleaved data streams, and wherein the interleaved data is modulated.

* * * * *